US009242233B2

(12) United States Patent
Ghosh et al.

(10) Patent No.: US 9,242,233 B2
(45) Date of Patent: Jan. 26, 2016

(54) CATALYST FOR LIGHT NAPHTHA AROMATIZATION

(75) Inventors: Ashim K. Ghosh, Houston, TX (US); Scott A. Stevenson, Houston, TX (US); Neeta Kulkarni, Houston, TX (US); Mike Mier, Waller, TX (US); Balamurali K. Nair, Sugarland, TX (US); Dustin Farmer, Houston, TX (US)

(73) Assignee: SAUDI BASIC INDUSTRIES CORPORATION, Riyadh (SA)

( * ) Notice: Subject to any disclaimer, the term of this patent is extended or adjusted under 35 U.S.C. 154(b) by 587 days.

(21) Appl. No.: 13/462,230

(22) Filed: May 2, 2012

(65) Prior Publication Data
US 2013/0296625 A1  Nov. 7, 2013

(51) Int. Cl.
| | |
|---|---|
| *B01J 29/06* | (2006.01) |
| *B01J 29/04* | (2006.01) |
| *B01J 29/62* | (2006.01) |
| *B01J 29/67* | (2006.01) |
| *B01J 29/74* | (2006.01) |
| *B01J 29/068* | (2006.01) |
| *B01J 29/40* | (2006.01) |
| *B01J 29/44* | (2006.01) |
| *B01J 37/00* | (2006.01) |
| *C01B 39/02* | (2006.01) |
| *C01B 39/40* | (2006.01) |
| *C10G 35/06* | (2006.01) |
| *C10G 35/09* | (2006.01) |

(52) U.S. Cl.
CPC .............. *B01J 29/047* (2013.01); *B01J 29/068* (2013.01); *B01J 29/405* (2013.01); *B01J 29/44* (2013.01); *B01J 29/62* (2013.01); *B01J 29/67* (2013.01); *B01J 29/7469* (2013.01); *B01J 29/7476* (2013.01); *B01J 29/7484* (2013.01); *B01J 29/7492* (2013.01); *B01J 37/0009* (2013.01); *C01B 39/026* (2013.01); *C01B 39/40* (2013.01); *C10G 35/065* (2013.01); *C10G 35/09* (2013.01); *B01J 29/7461* (2013.01); *B01J 2229/186* (2013.01); *B01J 2229/42* (2013.01)

(58) Field of Classification Search
USPC .......................................... 502/63, 64, 66, 71
See application file for complete search history.

(56) References Cited

U.S. PATENT DOCUMENTS

| | | | |
|---|---|---|---|
| 3,702,886 A | 11/1972 | Argauer et al. | |
| 4,104,320 A | 8/1978 | Bernard et al. | |
| 4,239,615 A | 12/1980 | Tu | |
| 4,417,083 A | 11/1983 | Bernard et al. | |
| 4,435,283 A | 3/1984 | Buss et al. | |
| 4,485,185 A | 11/1984 | Onodera et al. | |
| 4,517,306 A | 5/1985 | Buss | |
| 4,595,669 A | 6/1986 | Fung et al. | |
| 4,645,586 A | 2/1987 | Buss | |
| 4,652,360 A | 3/1987 | Dessau | |
| 4,839,027 A | 6/1989 | Absil et al. | |
| 4,867,864 A | 9/1989 | Dessau | |
| 4,925,819 A | 5/1990 | Fung et al. | |
| 5,053,374 A | 10/1991 | Absil et al. | |
| 5,114,565 A | 5/1992 | Zones et al. | |
| 5,328,595 A | 7/1994 | Rainis | |
| 5,358,631 A | 10/1994 | Miller et al. | |
| 5,500,109 A | 3/1996 | Keville et al. | |
| 5,552,035 A | 9/1996 | Potter et al. | |
| 5,976,490 A | 11/1999 | Wendelbo | |
| 6,063,724 A | 5/2000 | Resasco et al. | |
| 6,365,767 B1 | 4/2002 | Chang et al. | |
| 6,709,570 B1 | 3/2004 | Van Crijnen-Beers et al. | |
| 6,784,333 B2 | 8/2004 | Juttu et al. | |
| 7,153,801 B2 | 12/2006 | Wu | |
| 7,582,583 B2 | 9/2009 | Bosch et al. | |
| 7,601,330 B2 | 10/2009 | Wang et al. | |
| 7,651,968 B2 | 1/2010 | Bosch et al. | |
| 7,893,311 B2 | 2/2011 | Takamatsu et al. | |
| 7,902,103 B2 | 3/2011 | Beekman et al. | |
| 7,902,413 B2 | 3/2011 | Stevenson et al. | |
| 7,906,696 B2 | 3/2011 | Juttu et al. | |
| 8,119,551 B2 | 2/2012 | Stevenson et al. | |
| 2008/0255398 A1 | 10/2008 | Stevenson et al. | |
| 2008/0293989 A1 | 11/2008 | Khanmamedova et al. | |
| 2008/0293990 A1 | 11/2008 | Stevenson et al. | |
| 2009/0156871 A1 | 6/2009 | Khare | |
| 2010/0063341 A1 | 3/2010 | Heng et al. | |
| 2010/0206775 A1 | 8/2010 | Beeckman et al. | |
| 2011/0132804 A1 | 6/2011 | Stevenson et al. | |
| 2011/0192766 A1 | 8/2011 | McCarthy et al. | |
| 2011/0282122 A1 | 11/2011 | Wang et al. | |

FOREIGN PATENT DOCUMENTS

| | | |
|---|---|---|
| CN | 101134171 B | 12/2010 |
| EP | 145289 B2 | 11/2000 |
| EP | 1115657 B1 | 5/2003 |
| GB | 1305137 A | 1/1973 |
| GB | 1356464 A | 6/1974 |
| JP | 2004123412 A | 4/2004 |
| WO | 9413584 A1 | 6/1994 |
| WO | 2008/153758 A2 | 12/2008 |
| WO | 2011/068964 A1 | 6/2011 |

OTHER PUBLICATIONS

PCT ISR.
PCT Written Opinion.
Aromatization of Hydrocarbons over Platinum Alkaline Earth Zeolites, T. R. Hughes, W. C. Buss, P. W. Tamm and R. L. Jacobson, Proceedings of 7.sup.th International Zeolite Conference, Tokyo, p. 725-732 (1986).

(Continued)

*Primary Examiner* — Elizabeth Wood
(74) *Attorney, Agent, or Firm* — Cantor Colburn LLP

(57) ABSTRACT

Methods for preparing bound non-acidic germanium zeolite catalysts are disclosed, where the preparation is reproducible and scalable and where the catalysts have similar or the same activity and selectivities of a standard naphtha aromatization catalyst and methods for aromatizing naphtha.

17 Claims, 5 Drawing Sheets

(56) References Cited

OTHER PUBLICATIONS

Octane Enhancement by Selective Reforming of Light Paraffins, P. W. Tamm, D. H. Mohr, and C. R. Wilson, Catalysis 1987, J. W. Ward (Editor), p. 335-353 (1988).

Effect of Sulfur on the Performance and on the Particle Size and Location of Platinum in Pt/K Hexane Aromatization Catalysts, G. B. McVicker, J. L Kao, J. Ziemiak, W. E. Gates, J. L. Robbins, M. M. J. Treacy, S. N. Rice, T. H. Vanderspurt, V. R. Cross and A. K. Ghosh, Journal of Catalysis, vol. 139, p. 46-61 (1993).

Selective Catalytic Process for Conversion of Light Naphtha to Aromatics, D. V. Law, P. W. Tamm and C. M. Detz, Energy Progress, vol. 7, No. 4, p. 215-222 (Dec. 1987).

CN 102039168 A English Abstract; Date of Publication: May 4, 2011; 2 pages.

CN102039165 A English Abstract; Date of Publication: May 4, 2011; 2 pages.

Otremba et al.; "Temperature-programmed Desorption of n-Propylbenzene from HNaZSM-5 and Na(Li, K, Rb, Cs) ZSM-5 Type Zeolites"; Reaction Kinetics and Catalysis Letters 51(2); pp. 481-487; Dec. 1993.

CATALYST FOR LIGHT NAPHTHA AROMATIZATION

BACKGROUND OF THE INVENTION

1. Field of the Invention

Embodiments of the present invention relate to methods for producing cesium (Cs) exchanged, noble metal impregnated, germanium zeolite catalysts, to methods for using the catalysts and to catalysts made by the methods, where the catalysts are used to aromatize light naphtha hydrocarbons. The methods also permit easy scaling-up of Cs exchanged, noble metal impregnated, germanium zeolite catalysts having desired catalytic properties including catalytic activity, catalytic selectivity, stability, and crush strength.

More particularly, embodiments of the present invention relate methods for producing Cs exchanged, noble metal impregnated, germanium zeolite catalysts, to methods for using the catalysts and to catalysts made by the methods, where the catalysts are used to aromatize light naphtha hydrocarbons, where the steps of preparing the catalyst are performed under controlled temperature conditions at each step of the process to ensure that the catalysts have desired properties including catalytic activity, catalytic selectivity, stability, and crush strength.

2. Description of the Related Art

Naphtha is mainly a mixture of straight-chain, branched and cyclic aliphatic hydrocarbons. Naphtha is generally divided into light naphtha having from five to nine carbon atoms per molecule and heavy naphtha having from seven to twelve carbons per molecule. Typically, light naphtha contains naphthenes, such as cyclohexane and methylcyclopentane, and linear and branched paraffins, such as hexane and pentane. Light naphtha typically contains 60% to 99% by weight of paraffins and cycloparaffins. Light naphtha can be characterized as a petroleum distillate having a molecular weight range between about 70 g/mol and about 150 g/mol, a specific gravity range between about 0.6 g/cm$^3$ and about 0.9 g/cm$^3$, a boiling point range between about 50° F. and about 320° F. and a vapor pressure between about 5 mm Hg (torr) and about 500 mm Hg (torr) at room temperature. Light naphtha may be obtained from crude oil, natural gas condensate or other hydrocarbons streams by a variety of processes, e.g., distillation.

Zeolite is a crystalline hydrated aluminosilicate that may also contain other elements in the crystalline framework and/or deposited on its surface. The term "zeolite" includes not only aluminosilicates but substances in which the aluminum is replaced by other trivalent elements and substances in which silicon is replaced by other tetravalent elements. Generally, zeolites are structures of TO$_4$ tetrahedra, which form a three dimensional network by sharing oxygen atoms where T represents tetravalent elements, such as silicon, and trivalent elements, such as aluminum.

A zeolite may be prepared by (a) preparing an aqueous mixture of silicon oxide, aluminum oxide and, optionally, oxides of other trivalent or tetravalent elements; and (b) maintaining said aqueous mixture under crystallization conditions until crystals of said zeolite form. The reaction mixture gel is heated and stirred to form zeolite crystals and then cooled. The zeolite crystals are separated from the gel and are washed, dried and calcined. Elements may be deposited on the zeolite by any means known in the art, for example, metals deposited by impregnation or ion-exchange.

Aromatization of alkanes is a multi-step process of dehydrogenation of the alkane, cyclization of the dehydrogenated alkane and aromatization of the cyclized alkane. The catalyst for this process must be multi-functional to have an acceptable conversion and selectivity for the desired products. Zeolites are known catalysts for isomerization, toluene disproportionation, transalkylation, hydrogenation and alkane oligomerization and aromatization. Some zeolite catalysts, especially those containing a Group VIII deposited metal, are susceptible to sulfur poisoning.

U.S. Pat. No. 5,358,631 discloses a process for catalytic reforming or dehydrocyclization of hydrocarbons using a catalyst of a noble metal on an intermediate pore size crystalline silicate having a high silica to alumina ratio (greater than 200) and a relatively low alkali content (less than 6000 ppm). The patented catalyst has sulfur tolerance up to 2 ppm. Low acidity of the catalyst is attained not by using large amounts of alkali but by low aluminum content with low amounts of alkali and/or use of alkaline earth metal, such as magnesium, in the catalyst. Germanium is disclosed as a promoter metal in a conventional reforming catalyst and is added to the catalyst after zeolite synthesis and the germanium does not become part of the zeolite framework.

U.S. Pat. No. 4,652,360 discloses a catalyst of zeolite, preferably ZSM-5 or ZSM-22, on which a Group VIII metal, such as platinum, has been deposited and which has been base-exchanged with Group IA metal cations, such as sodium hydroxide, potassium chloride or cesium hydroxide, to lower or essentially eliminate, the base exchangeable acidic content of the catalyst composition. One example illustrates n-hexane dehydrocyclization using Pt/ZSM-5 catalysts with and without Cs base-exchange treatment. There is no disclosure of germanium in the catalyst.

U.S. Pat. No. 7,153,801 discloses a method of making a catalyst of a large pore zeolite impregnated with platinum and at least one organic ammonium halide of the formula N(R)$_4$X where X is a halide and R is a substituted or unsubstituted carbon-chain molecule having 1-20 carbon atoms. The ammonium halide may be an acid halide and an ammonium hydride of the formula N(R')$_4$OH where R' is hydrogen or a substituted or unsubstituted carbon chain molecule having 12-20 carbon atoms. The catalyst is a bound potassium L-type zeolite (KL zeolite) used to dehydrocyclize aliphatic hydrocarbons ($C_6$-$C_8$ petroleum naphtha) to produce aromatic hydrocarbons (benzene, toluene and xylenes).

U.S. Pat. No. 4,867,864 discloses a dehydrogenation/dehydrocyclization process with a non-acidic catalyst of zeolite beta and a dehydrogenation/hydrogenation metal, such as platinum. $C_2$-$C_5$ paraffins are dehydrogenated and $C_6$-$C_{12}$ paraffins are dehydrocyclized. The acid content has been reduced by ion-exchange of acid sites with Group IA and/or IIA cations, preferably cesium. Hydrogen must be added during dehydrocyclizaton.

Catalysts of platinum deposited on potassium L-zeolite which has been alkaline earth-exchanged (magnesium, calcium, strontium and barium) were disclosed for aromatization of paraffins, especially hexanes and heptanes, in Aromatization of Hydrocarbons over Platinum Alkaline Earth Zeolites, T. R. Hughes, W. C. Buss, P. W. Tamm and R. L. Jacobson, Proceedings of 7.sup.th International Zeolite Conference, Tokyo, p. 725-732 (1986). This catalyst is extremely sensitive to poisoning by sulfur.

The Aromax® Process selectively converts $C_6$-$C_7$ paraffins to high octane aromatics utilizing a platinum supported L-type zeolite catalyst of low acidity. A relatively high amount of hydrogen co-feed is required. The Pt/KL zeolite catalyst is sulfur-sensitive. The sulfur level in the feed must be controlled to low levels so that the catalyst is not deactivated. Octane Enhancement by Selective Reforming of Light Paraffins, P. W. Tamm, D. H. Mohr, and C. R. Wilson, Catalysis 1987, J. W. Ward (Editor), p. 335-353 (1988). Selective Catalytic Process for Conversion of Light Naphtha to Aromatics, D. V. Law, P. W. Tamm and C. M. Detz, Energy Progress, vol. 7, no. 4, p. 215-222 (December, 1987).

U.S. Pat. No. 4,517,306 discloses a catalyst for reforming paraffins containing at least 6 carbon atoms into corresponding aromatic hydrocarbons. The catalyst is a type L zeolite, an alkaline earth metal and a Group VIII metal which has been reduced with hydrogen. One essential element of the catalyst was the presence of the alkaline earth metal which must be barium, strontium or calcium, preferably barium since it lessens the acidity of the catalyst.

U.S. Pat. No. 4,104,320 discloses a method of dehydrocyclizing aliphatic hydrocarbons in the presence of hydrogen to form corresponding aromatic hydrocarbons with a catalyst of a type L zeolite which has at least 90% alkali metal (sodium, lithium, potassium, rubidium and cesium) exchangeable cations and contains a group VIII dehydrogenating metal and, optionally tin and/or germanium. Again, these metals are added to the catalyst after zeolite synthesis and do not form part of the zeolite framework. No example containing germanium was prepared.

U.S. Pat. No. 4,417,083 discloses a process for production of aromatic hydrocarbons from petroleum fractions containing paraffins in the presence of hydrogen and a catalyst of noble metals and, optionally, sulfur deposited on a crystalline zeolitic aluminosilicate, such as zeolite L, having a pore size of larger than 6.5 Å and substituted with more than 90% alkali metal cations, such as potassium. It is disclosed that the catalyst can contain rhenium, iridium, tin or germanium in the range of 0-1.5% but no example of a catalyst containing germanium is disclosed. Again, these metals are added to the catalyst after zeolite synthesis and do not form part of the zeolite framework.

U.S. Pat. No. 4,435,283 discloses a method of dehydrocyclizing alkanes, such as n-hexane, with a catalyst of a large-pore zeolite, such as type L zeolite, a Group VIII metal, such as platinum, and an alkaline earth metal (barium, strontium or calcium). Selectivity for n-hexane dehydrocyclization is greater than 60%. The feedstock is substantially free of sulfur and other known poisons for reforming catalysts.

U.S. Pat. No. 6,063,724 discloses a sulfur-tolerant Pt/KL-zeolite aromatization catalyst. The catalyst has a rare earth ion, such as lanthanum, cerium, praseodymium, neodymium, samarium, europium, gadolinium, terbium, dysprosium, holmium, erbium, thulium, ytterbium or lutetium, incorporated with the L-zeolite. Incorporation of the rare earth ion is by ion-exchange, incipient wetness impregnation, chemical vapor deposition or other methods for dispersion of the ions and is after calcination of the L-zeolite.

Deactivation of the Pt/KL-zeolite catalyst in hexane aromatization appears to occur by agglomeration of the platinum and blockage of the zeolite channels. Sulfur accelerates platinum agglomeration and reduces the number of accessible catalytic sites but does not appear to modify activity and selectivity of the catalytic sites. Effect of Sulfur on the Performance and on the Particle Size and Location of Platinum in Pt/K Hexane Aromatization Catalysts, G. B. McVicker, J. L Kao, J. Ziemiak, W. E. Gates, J. L. Robbins, M. M. J. Treacy, S. N. Rice, T. H. Vanderspurt, V. R. Cross and A. K. Ghosh, Journal of Catalysis, vol. 139, p. 46-61 (1993).

These zeolitic aromatization catalysts, while active, are subject to problems in preparing the catalysts and in scaling up the preparations. Thus, there is a clear and real need in the art for new methods for preparing zeolitic aromatization catalysts that are amenable to ready scale-up and produce catalysts having desirable catalyst properties including of stability, activity, selectivity and crush strength and to the catalysts prepared by these new methods.

SUMMARY OF THE INVENTION

Processes for Preparing and Using Germanium Based ZSM-5 Catalysts

Embodiments of this invention provide processes for preparing a naphtha aromatization catalyst comprising detemplating a template agent-containing germanium ZSM-5 material under a time/temperature protocol sufficient to removal all or substantially all of the templating agent in the germanium ZSM-5 material, where the time/temperature protocol includes a detemplating time period between 1 hour and 12 hours at a detemplating temperature between 400° C. and 600° C. The methods also include the steps (i) and (ii) in any order, where the step (i) includes ion-exchanging the detemplated germanium ZSM-5 material with cesium (Cs) containing solution to form a non-acidic or substantially non-acidic Cs exchanged germanium ZSM-5 material, where said step of ion-exchanging is performed at a temperature between room temperature and 100° C.; and the step (ii) includes impregnating the detemplated germanium ZSM-5 material with platinum (Pt) to form a Pt impregnated germanium ZSM-5 material. The methods also include the step of heating the detemplated germanium ZSM-5 material immediately after step (i) according to a heating time/temperature protocol, where the heating time/temperature protocol includes a heating time between 1 hour and 12 hours at a temperature from 250° C. to 300° C., and heating the detemplated germanium ZSM-5 material immediately after step (ii) according to a heating time/temperature protocol, where the heating time/temperature protocol includes a heating time between 1 hour and 12 hours at a temperature ranging from 250° C. to less than 500° C. The methods also include the step, after performing both steps (i) and (ii), of heating the detemplated germanium ZSM-5 material according to a heating time/temperature protocol, where the heating time/temperature protocol includes a heating time between 1 hour and 12 hours at a temperature ranging from 250° C. to less than 500° C. The methods also includes the steps (1) adding between 20 wt. % to 60 wt. % of a binder composition to form a bound detemplated germanium ZSM-5 material after steps (i) and (ii); and forming bound materials into a shaped body, and (2) calcining the bound detemplated germanium ZSM-5 material from step (1) according to a calcining time/temperature protocol including a calcining time period between 1 hour and 12 hours at a calcining temperature less than or equal to 500° C. Examples of shaped bodies as that term is used throughout this specification include, but are not limited, to spherical, cylindrical, pellet, tablet and other shapes, and any such shapes may be formed or extruded or non-extruded. One specific example is ⅛ inch cylindrically-shaped extrudates.

Embodiments of this invention provide processes for preparing a naphtha aromatization catalyst comprising adding between 20 wt. % to 60 wt. % of a binder composition to a template agent-containing germanium ZSM-5 material to form a bound germanium ZSM-5 material and forming bound germanium ZSM-5 materials into a shaped body, and calcining the extruded germanium ZSM-5 for a time period between 1 hour and 12 hours at a calcining temperature between 400° C. and 600° C. (to remove the template). The methods also include the steps (i) and (ii) in any order, where in the step (i) includes ion-exchanging the detemplated germanium ZSM-5 material with cesium (Cs) containing solution to form a non-acidic or substantially non-acidic Cs exchanged germanium ZSM-5 material, where said step of ion-exchanging is performed at a temperature between room temperature and 100° C.; and the step (ii) includes impregnating the detemplated germanium ZSM-5 material with platinum (Pt) to form a Pt impregnated germanium ZSM-5 material. The methods also include the step of heating the detemplated germanium ZSM-5 material immediately after step (i) according to a heating time/temperature protocol, where the heating time/temperature protocol includes a heating time between 1 hour and 12 hours at a temperature from 250° C. to 300° C., and heating the detemplated germanium ZSM-5 material immediately after step (ii) according to a heating time/temperature protocol, where the heating time/temperature protocol includes a heating time between 1 hour and 12 hours at a temperature ranging from 250° C. to less than 500° C. The methods also include the step after performing both steps (i) and (ii), heating the detemplated germanium ZSM-5 material according to a heating time/temperature protocol, where the heating time/temperature protocol includes a heating time between 1 hour and 12 hours at a temperature ranging from 250° C. to less than 500° C.

Embodiments of this invention also relate broadly to processes for aromatizing a light naphtha hydrocarbon feed comprising contacting a light naphtha feed comprising $C_6$-$C_{12}$ alkanes with a catalyst prepared by the above processes; and thereafter, recovering a hydrocarbon product comprising aromatics hydrocarbons.

Processes for Preparing and Using Germanium Based Zeolite Catalysts

Embodiments of this invention provide processes for preparing a naphtha aromatization catalyst comprising detemplating a template agent-containing germanium zeolite material under a time/temperature protocol sufficient to removal all or substantially all of the templating agent in the germanium zeolite material, where the time/temperature protocol includes a detemplating time period between 1 hour and 12 hours at a detemplating temperature between 400° C. and 600° C. The methods also include the steps (i) and (ii) in any order, where the step (i) includes ion-exchanging the detemplated germanium zeolite material with cesium (Cs) containing solution to form a non-acidic or substantially non-acidic Cs exchanged germanium zeolite material, where said step of ion-exchanging is performed at a temperature between room temperature and 100° C.; and the step (ii) includes impregnating the detemplated germanium zeolite material with platinum (Pt) to form a Pt impregnated germanium zeolite material. The methods also include the step of heating the detemplated germanium zeolite material immediately after step (i) according to a heating time/temperature protocol, where the heating time/temperature protocol includes a heating time between 1 hour and 12 hours at a temperature from 250° C. to 300° C., and heating the detemplated germanium zeolite material immediately after step (ii) according to a heating time/temperature protocol, where the heating time/temperature protocol includes a heating time between 1 hour and 12 hours at a temperature ranging from 250° C. to less than 500° C. The methods also include the step, after performing both steps (i) and (ii), of heating the detemplated germanium zeolite material according to a heating time/temperature protocol, where the heating time/temperature protocol includes a heating time between 1 hour and 12 hours at a temperature ranging from 250° C. to less than 500° C. The methods also includes the steps (1) adding between 20 wt. % to 60 wt. % of a binder composition to form a bound detemplated germanium zeolite material after steps (i) and (ii); and forming bound germanium zeolite materials into a shaped body, and (2) calcining the bound detemplated germanium zeolite material from step (1) according to a calcining time/temperature protocol including a calcining time period between 1 hour and 12 hours at a calcining temperature less than or equal to 500° C.

Embodiments of this invention provide processes for preparing a naphtha aromatization catalyst comprising adding between 20 wt. % to 60 wt. % of a binder composition to a template agent-containing germanium zeolite material to form a bound germanium zeolite material and forming bound templated germanium zeolite materials into a shaped body, and calcining the extruded germanium zeolite for a time period between 1 hour and 12 hours at a calcining temperature between 400° C. and 600° C. (to remove the template). The methods also include the steps (i) and (ii) in any order, where in the step (i) includes ion-exchanging the detemplated germanium zeolite material with cesium (Cs) containing solution to form a non-acidic or substantially non-acidic Cs exchanged germanium zeolite material, where said step of ion-exchanging is performed at a temperature between room temperature and 100° C.; and the step (ii) includes impregnating the detemplated germanium zeolite material with platinum (Pt) to form a Pt impregnated germanium zeolite material. The methods also include the step of heating the detemplated germanium zeolite material immediately after step (i) according to a heating time/temperature protocol, where the heating time/temperature protocol includes a heating time between 1 hour and 12 hours at a temperature from 250° C. to 300° C., and heating the detemplated germanium zeolite material immediately after step (ii) according to a heating time/temperature protocol, where the heating time/temperature protocol includes a heating time between 1 hour and 12 hours at a temperature ranging from 250° C. to less than 500° C. The methods also include the step after performing both steps (i) and (ii), heating the detemplated germanium zeolite material according to a heating time/temperature protocol, where the heating time/temperature protocol includes a heating time between 1 hour and 12 hours at a temperature ranging from 250° C. to less than 500° C. The exchange metal is an alkali metal selected from the group consisting of Na, K, Rb, Cs; an alkaline earth metal selected from the group consisting of Mg, Ca, Sr, Ba, and any combination thereof and the noble metal is selected from the group consisting of Pt, Pd, Ir, Rh, Ru, and any combination thereof.

Embodiments of this invention also relate broadly process for aromatizing a light naphtha hydrocarbon feed comprising contacting a light naphtha feed comprising $C_6$-$C_{12}$ alkanes with a catalyst prepared by the above processes; and thereafter, recovering a hydrocarbon product comprising aromatics hydrocarbons.

Embodiments Using Binders

In embodiments of the catalysts of this invention using a binder mixture including at least one solid binder and at least one single colloidal binder, the binders have particle sizes between 10 nm and 30 nm. In other embodiments, the binder mixture has particle sizes between 10 nm and 25 nm. In embodiments using mixtures of binders including at least one solid binder and a mixture of colloidal binders, the mixtures of colloidal binders include at least 10 wt. % of a colloidal binder having particle sizes between 10 nm and 30 nm, while the remaining colloidal binders may have particles sizes between 1 nm and 30 nm. In other embodiments, the mixtures include at least 20 wt. % of a colloidal binder having particle sized between 10 nm and 30 nm, while the remaining binders may have particle sizes between 5 nm and 10 nm. In other embodiments, the binders have a surface area less than or equal to 250 m²/g. In other embodiments, the binders have a surface area between 250 m²/g and 100 m²/g.

Processes for Using the Catalysts of this Invention

Embodiments of this invention provide methods for aromatizing a naphtha hydrocarbon feed including contacting a naphtha hydrocarbon feed with a catalyst of this invention and recovering a product including aromatized naphtha derived hydrocarbons.

Embodiments of this invention provide processes for increasing octane number of a hydrocarbon feed comprising: a) contacting a hydrocarbon feed comprising naphtha having $C_6$-$C_8$ alkanes with a catalyst composition of this invention under conditions for concurrently isomerizing n-paraffins to isoparaffins, isomerizing isoparaffins to more highly branched isoparaffins, cracking n-paraffins to smaller n-isoparaffins, dehydrogenating both n-paraffins and isoparaffins and dehydrocyclizing n-paraffins to aromatics; and b) recovering a hydrocarbon product. The naphtha feed may have a $C_6$-$C_8$ content of at least 30%. In certain embodiments, the naphtha feed is at least 40%. In other embodiments, the naphtha feed is at least 50%.

Embodiments of the invention provide aromatization of alkanes using the catalysts of this invention, where the alkanes have between six and twelve carbon atoms per molecule, to produce aromatics, such as benzene, ethyl benzene, toluene and xylene. The contact between the alkanes and the catalyst is at a liquid hourly space velocity in a range between $0.1\ h^{-1}$ and $100\ h^{-1}$, at a temperature greater than or equal to 450° C., and at a pressure in a range between 5 psia and 315 psia. In other embodiments, the contact between the alkanes and the catalyst is at a liquid hourly space velocity in a range between $0.1\ h^{-1}$, and $100\ h^{-1}$, at a temperature in a range between 450° C. and 650° C. and at a pressure in a range between 5 psia and 315 psia. In other embodiments, the contact between the alkanes and the catalyst is at a liquid hourly space velocity in a range between $0.1\ h^{-1}$ and $100\ h^{-1}$, at a temperature in a range between 450° C. and 625° C. and at a pressure in a range between 5 psia and 315 psia. In other embodiments, the contact between the alkanes and the catalyst is at a liquid hourly space velocity in a range between $0.1\ h^{-1}$ and $100\ h^{-1}$, at a temperature in a range between 450° C. and 600° C. and at a pressure in a range between 5 psia and 315 psia. In other embodiments, the contact between the alkanes and the catalyst is at a liquid hourly space velocity in a range between $0.1\ h^{-1}$ and $100\ h^{-1}$, at a temperature in a range between 450° C. and 575° C. and at a pressure in a range between 5 psia and 315 psia. In other embodiments, the contact between the alkanes and the catalyst is at a liquid hourly space velocity in a range between $0.1\ h^{-1}$ and $100\ h^{-1}$, at a temperature in a range between 450° C. and 550° C. and at a pressure in a range between 5 psia and 315 psia. In other embodiments, the contact between the alkanes and the catalyst is at a liquid hourly space velocity in a range between $0.1\ h^{-1}$ and $100\ h^{-1}$, at a temperature in a range between 475° C. and 550° C. and at a pressure in a range between 5 psia and 315 psia.

BRIEF DESCRIPTION OF THE DRAWINGS

The invention can be better understood with reference to the following detailed description together with the appended illustrative drawings in which like elements are numbered the same.

DETAILED DESCRIPTION OF THE INVENTION

Figure 1:
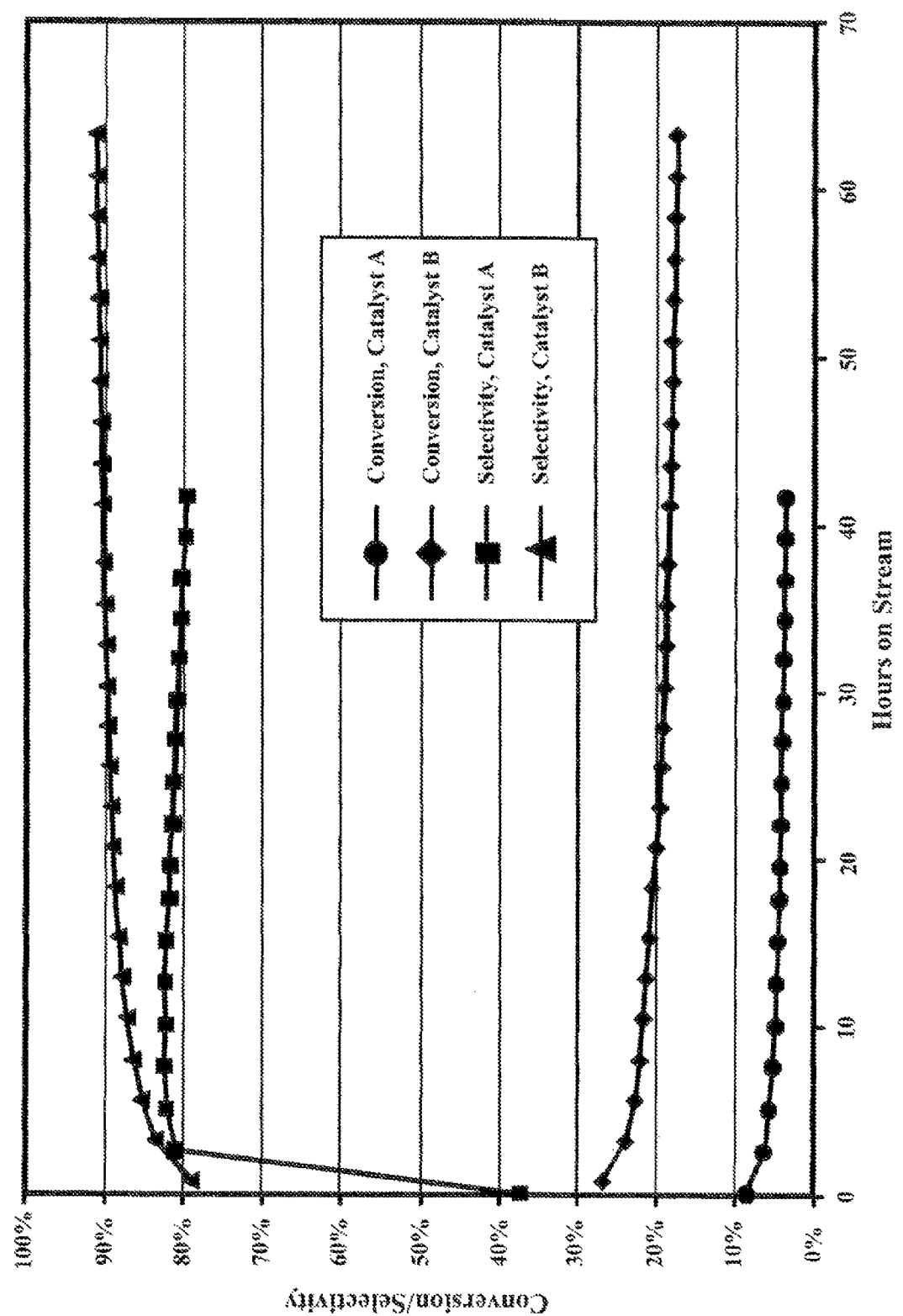
FIG. 1 depicts a plot of the catalyst performance of Catalyst A and B.

The inventors have found that noble metal impregnated, cesium exchanged, germanium zeolite catalysts for the aromatization of hydrocarbon feeds can be prepared by methods that are scalable and produce catalysts with desired catalytic properties including activity, selectivity, crush strength, and stability by carefully controlling time/temperature protocols in the steps of detemplating, ion-exchanging, drying, heating, and calcining. The inventors have found that the noble metal impregnated, cesium exchanged, germanium zeolite catalysts of this invention have substantially the same or the same catalyst activity and selectivities as a standard naphtha aromatization catalyst. The inventors have found specifically that extruded naphtha aromatization CsPt/GeZSM-5 catalysts having desirable catalytic properties can be prepared by carefully controlling time/temperature protocols in the steps of detemplating, ion-exchanging, drying, heating, and calcining. The resulting methods are amenable to ready scalability. As used herein, the terms "a" and "an" mean one or more, with the singular encompassing the plural and vice versa, unless expressly stated otherwise, or if otherwise obvious from the context. For example, reference to forming catalyst material into a shaped body includes forming the catalyst material into more than one shaped body.

Embodiments of the invention broadly relate to processes for preparing a naphtha aromatization catalyst comprising:
a) detemplating a template agent-containing germanium ZSM-5 material under a time/temperature protocol sufficient to removal all or substantially all of the templating agent in the germanium ZSM-5 material, where the time/temperature protocol includes a detemplating time period between 1 hour and 12 hours at a detemplating temperature between 400° C. and 600° C.;
or
b) adding between 20 wt. % to 60 wt. % of a binder composition to a template agent-containing germanium ZSM-5 material to form a bound germanium ZSM-5 material and extruding the bound templated germanium ZSM-5 material to form an extruded germanium ZSM-5 material and calcining the extruded germanium ZSM-5 for a time period between 1 hour and 12 hours at a calcining temperature between 400° C. and 600° C. (to remove the template);
and thereafter, performing steps (i) and (ii) in any order:
(i) ion-exchanging the detemplated germanium ZSM-5 material with cesium (Cs) containing solution to form a non-acidic or substantially non-acidic Cs exchanged germanium ZSM-5 material, where said step of ion-exchanging is performed at a temperature between room temperature and 100° C.;
(ii) impregnating the detemplated germanium ZSM-5 material with platinum (Pt) to form a Pt impregnated germanium ZSM-5 material; and
heating the detemplated germanium ZSM-5 material immediately after step (i) according to a heating time/temperature protocol, where the heating time/temperature protocol includes a heating time between 1 hour and 12 hours at a temperature from 250° C. to 300° C., and heating the detemplated germanium ZSM-5 material immediately after step (ii) according to a heating time/temperature protocol, where the heating time/temperature protocol includes a heating time between 1 hour and 12 hours at a temperature ranging from 250° C. to less than 500° C.;

or after performing both steps (i) and (ii), heating the detemplated germanium ZSM-5 material according to a heating time/temperature protocol, where the heating time/temperature protocol includes a heating time between 1 hour and 12 hours at a temperature ranging from 250° C. to less than 500° C.;

with the proviso that if the process is performed using step (a), the following additional steps must be performed:

(1) adding between 20 wt. % to 60 wt. % of a binder composition to form a bound detemplated germanium ZSM-5 material and forming a bound detemplated germanium zeolite materials into shaped body and (2) calcining the bound detemplated germanium ZSM-5 material from step (1) according to a calcining time/temperature protocol including a calcining time period between 1 hour and 12 hours at a calcining temperature less than or equal to 500° C.

In certain embodiments, the impregnating step is a wet-incipient impregnating step. In other embodiments, the methods further comprising repeating the ion-exchanging step at least once. Iii other embodiments, the shaped germanium ZSM-5 materials are ⅛-inch extrudates. In other embodiments, the detemplating temperature is between 425° C. and 600° C.; the heating temperature for said heating step immediately after step (i) is between 250° C. and 350° C.; the heating temperature for said heating step immediately after step (ii) is less than or equal to 450° C., and said step of calcining in step (2) is performed at a temperature of less than or equal to 450° C. In other embodiments, the detemplating temperature is between 450° C. and 600° C.; the heating temperature for said heating step immediately after step (i) is between 250° C. and 300° C.; the heating temperature for said heating step immediately after step (ii) is less than or equal to 400° C., and said step of calcining in step (2) is performed at a temperature of less than or equal to 400° C. In other embodiments, the detemplating temperature is between 475° C. and 600° C.; the heating temperature for said heating step immediately after step (i) is between 275° C. and 325° C.; the heating temperature for said heating step immediately after step (ii) is less than or equal to 350° C., and said step of calcining in step (2) is performed at a temperature of less than or equal to 350° C. In other embodiments, the detemplating temperature is between 500° C. and 600° C.; the heating temperature for said heating step immediately after step (i) between 275° C. and 300° C.; the heating temperature for said heating step immediately after step (ii) is less than or equal to 300° C., and said step of calcining in step (2) is performed at a temperature of less than or equal to 300° C. In other embodiments, the binder comprises either a solid binder and a colloidal binder having particles between 10 nm and 30 nm, or a solid binder and a mixture of colloidal binders including at least 10 wt. % of a first colloidal binder having particles between 10 nm and 30 nm and the remainder being a second colloidal binder having particles less than 10 nm. In other embodiments, the solid binder is selected from the group consisting of silica, alumina, magnesia, calcium oxide, and any combination thereof. In other embodiments, the first colloidal binder has a particle size between 10 nm and 25 nm. In other embodiments, the first colloidal binder has a surface area less than or equal to 250 $m^2/g$. In other embodiments, the first colloidal binder has a surface area between 250 $m^2/g$ and 100 $m^2/g$. In other embodiments, the amount of germanium is adjusted such that the final catalyst has germanium in a range of from 0.1 wt. % to 10 wt. % based on the total catalyst weight; the amount of platinum is adjusted such that the final catalyst has platinum in a range of from 0.05 wt. % to 3 wt. % based on the total catalyst weight; and the amount of cesium is adjusted such that the final catalyst has cesium in a range of from 2 wt. % to 8 wt. % based on the total catalyst weight.

Other embodiments of the invention also broadly relate to processes for aromatizing a light naphtha hydrocarbon feed comprising contacting a light naphtha feed comprising $C_6$-$C_{12}$ alkanes with a catalyst prepared by the process of set forth above; and thereafter, recovering a hydrocarbon product comprising aromatics hydrocarbons. In certain embodiments, the contacting between the feed and the catalyst is at a liquid hourly space velocity in the range between 0.1 $h^{-1}$ and 100 $h^{-1}$, at a temperature higher than 450° C., at a pressure in the range between 1 psia and 315 psia, and the feed comprises at least 30% $C_6$-$C_{10}$ alkanes. In other embodiments, the contacting between the feed and the catalyst is at a liquid hourly space velocity in a range between 0.1 $h^{-1}$ and 100 $h^{-1}$, at a temperature in a range between 450° C. and 550° C., at a pressure in a range between 5 psia and 315 psia, and the feed comprises at least 50% $C_6$-$C_{10}$ alkanes. In other embodiments, the feed comprises sulfur at levels up to 1000 ppm.

Yet, other embodiments of this invention relate broadly to processes for preparing a naphtha aromatization catalyst comprising:

a) detemplating a template agent-containing germanium zeolite material under a time/temperature protocol sufficient to removal all or substantially all of the templating agent in the germanium zeolite material, where the time/temperature protocol includes a detemplating time period between 1 hour and 12 hours at a detemplating temperature between 400° C. and 600° C.;

or b) adding between 20 wt. % to 60 wt. % of a binder composition to a template agent-containing germanium zeolite material to form a bound germanium zeolite material and forming bound templated germanium zeolite materials into shaped body, and calcining the shaped body of germanium zeolite for a time period between 1 hour and 12 hours at a calcining temperature between 400° C. and 600° C. (to remove the template);

and thereafter, performing steps (i) and (ii) in any order:

(i) ion-exchanging the detemplated germanium zeolite material with cesium (Cs) containing solution to form a non-acidic or substantially non-acidic Cs exchanged germanium zeolite material, where said step of ion-exchanging is performed at a temperature between room temperature and 100° C.;

(ii) impregnating the detemplated germanium zeolite material with platinum (Pt) to form a Pt impregnated germanium zeolite material; and heating the detemplated germanium zeolite material immediately after step (i) according to a heating time/temperature protocol, where the heating time/temperature protocol includes a heating time between 1 hour and 12 hours at a temperature from 250° C. to 300° C., and heating the detemplated germanium zeolite material immediately after step (ii) according to a heating time/temperature protocol, where the heating time/temperature protocol includes a heating time between 1 hour and 12 hours at a temperature ranging from 250° C. to less than 500° C.;

or
after performing both steps (i) and (ii), heating the detemplated germanium zeolite material according to a heating time/temperature protocol, where the heating time/temperature protocol includes a heating time between 1 hour and 12 hours at a temperature ranging from 250° C. to less than 500° C.;
with the proviso that if the process is performed using step (a), the following additional steps must be performed:
(1) adding between 20 wt. % to 60 wt. % of a binder composition to form a bound detemplated germanium zeolite material and forming bound germanium zeolite materials into shaped body, and
(2) calcining the bound detemplated germanium zeolite material from step (1) according to a calcining time/temperature protocol including a calcining time period between 1 hour and 12 hours at a calcining temperature less than or equal to 500° C.;
wherein the exchange metal is an alkali metal selected from the group consisting of Na, K, Rb, Cs; an alkaline earth metal selected from the group consisting of Mg, Ca, Sr, Ba, and any combination thereof, and,
further wherein the noble metal is selected from the group consisting of Pt, Pd, Ir, Rh, Ru, and any combination thereof.

In certain embodiments, the impregnating step is a wet-incipient impregnating step. In other embodiments, the binder comprises either a solid binder and a colloidal binder having particles between 10 am and 30 nm, or a solid binder and a mixture of colloidal binders including at least 10 wt. % of a first colloidal binder having particles between 10 nm and 30 nm and the remainder being a second colloidal binder having particles less than 10 nm. In other embodiments, the solid binder is selected from the group consisting of silica, alumina, magnesia, calcium oxide, and any combination thereof. In other embodiments, the germanium zeolite material is a medium pore zeolite having an average pore size in the range from 5 Å to 7 Å, has a $Si/Al_2$ atomic ratio of 40-500 and has a germanium content in the range from 0.1 wt. % to 10 wt. %. In other embodiments, the germanium zeolite material comprises a zeolite having a structure selected from the group consisting of MTW, FER, MEL, TON, MRE, MWW, MFI, BEA, MOR, LTL and MTT.

Still, other embodiments of the invention also broadly relate to processes for aromatizing a light naphtha hydrocarbon feed comprising contacting a light naphtha feed comprising $C_6$-$C_{12}$ alkanes with a catalyst prepared by the process of set forth above; and thereafter, recovering a hydrocarbon product comprising aromatics hydrocarbons.

In certain embodiments, the shaped body is an metal-exchanged, noble metal impregnated germanium zeolite catalysts shaped into ⅛-inch extrudates. The term "shaped bodies" as used throughout this specification include, but are not limited, to spherical, cylindrical, pellet, tablet, and other shapes, any such shapes may be formed or extruded or non-extruded. One specific example is ⅛ inch cylindrically-shaped extrudates.

Whether extruded or non-extruded, the bound catalysts of this invention prepared using the specified time/temperature protocols set forth above showed the same activity and selectivity as non-extruded or powdered catalysts as described in detail herein. These catalysts prepared by these methods also have good stability and crush strength.

In certain embodiments, the detemplating temperature of step a) and the calcining temperature of step b) are between 425° C. and 600° C.; the heating temperature after step (i) is between 200° C. and 350° C.; the heating temperature after step (ii) is less than or equal to 450° C., and the calcining temperature after step (2) is less than or equal to 450° C.

In other embodiments, the detemplating temperature of step a) and the calcining temperature of step b) are between 450° C. and 600° C.; the heating temperature after step (i) is between 250° C. and 300° C.; the heating temperature after step (ii) is less than or equal to 400° C., and the calcining temperature after step (2) is less than or equal to 400° C.

In other embodiments, the detemplating temperature of step a) and the calcining temperature of step b) are between 475° C. and 600° C.; the heating temperature after step (i) is between 275° C. and 325° C.; the heating temperature after step (ii) is less than or equal to 350° C., and the calcining temperature after step (2) is less than or equal to 350° C.

In other embodiments, the detemplating temperature of step a) and the calcining temperature of step b) are between 500° C. and 600° C.; the heating temperature after step (i) is between 275° C. and 300° C.; the heating temperature after step (ii) is less than or equal to 300° C., and the calcining temperature after step (2) is less than or equal to 300° C.

In certain embodiments, the activity of the catalysts of this invention is sufficient to give a percent conversion of at least 15% under the testing conditions described. In other embodiments, the activity of the catalysts is sufficient to give a percent conversion of at least 15.5% under the testing conditions described. In other embodiments, the activity of the catalysts is sufficient to give a percent conversion of at least 16% under the testing conditions described. In other embodiments, the activity of the catalysts is sufficient to give a percent conversion of at least 17% under the testing conditions described. In other embodiments, the activity of the catalysts is sufficient to give a percent conversion of at least 18% under the testing conditions described.

In certain embodiments, the selectivity of the catalysts is at least 90.0% under the testing conditions described. In other embodiments, the selectivity of the catalysts is at least 90.5% under the testing conditions described. In other embodiments, the selectivity of the catalysts is at least 91.0% under the testing conditions described. In other embodiments, the selectivity of the catalysts is at least 91.5% under the testing conditions described. In other embodiments, the selectivity of the catalysts is at least 92.0% under the testing conditions described.

Generally, mechanical strength of an extruded catalyst is measured to ensure the catalyst's ability to retain its physical integrity during use in a reactor. For extruded catalysts, crush strength is measured by placing a piece of the extrudate between two flat plates and applying a compressive load and measuring the force required to crush the piece of the extrudate. The catalyst crush strength or flat plate crush strength is reported hereinafter as "crush strength" in units of lb/mm. The catalysts prepared by the methods of this invention generally have a catalyst crush strength at least 1.0 lb/mm. In other embodiments, the catalyst crush strength is at least 1.25 lb/mm. In other embodiments, the catalyst crush strength is at least 1.50 lb/min. In other embodiments, the catalyst crush strength is at least 1.75 lb/mm. In other embodiments, the catalyst crush strength is at least 2.00 lb/mm. The acceptable crush strength of the catalysts prepared by the methods of this invention is one of the advantages of the methods of this invention for preparing the noble metal impregnated, metal exchanged, non-acid germanium zeolite catalysts.

Embodiments of the methods for preparing the catalysts of this invention include the step of contacting a naphtha hydrocarbon feed stream with a catalyst of this invention to form a product stream including aromatized hydrocarbons.

Embodiments of this invention also provide methods for aromatizing light naphtha using a catalyst of this invention. The methods involve contacting a catalyst of this invention with a light naphtha feed and recovering a product stream including at least one aromatic product such as benzene.

SUITABLE REAGENTS

Zeolites

Zeolites are crystalline hydrated aluminosilicates that may also contain elements other than aluminum and silicon in the crystalline framework. The term "zeolite" includes not only aluminosilicates, but substances in which the aluminum is replaced by other trivalent elements, and substances in which silicon is replaced by other tetravalent elements. Generally, zeolites are structures of $TO_4$ tetrahedra, which form a three dimensional network by sharing oxygen atoms where T represents tetravalent elements such as silicon, and trivalent elements such as aluminum. Zeolites are known catalysts for isomerization, toluene disproportionation, transalkylation, hydrogenation and alkane oligomerization and aromatization. Some zeolite catalysts, especially those containing a Group VIII deposited metal, are susceptible to sulfur poisoning.

Examples of the zeolite structure are MTW, FER, MEL, TON, MRE, MWW, MFI, BEA, MOR, LTL or MTT. In one embodiment of the invention the zeolite has a MFI structure. The term "ZSM-5" is used in this Specification to mean a zeolite having a MFI structure.

Germanium Zeolites

A germanium zeolite (GeZ) includes silicon, germanium and, optionally, aluminum in the crystalline framework of the zeolite structure. One example of the catalyst is an aluminosilicate zeolite having germanium in the framework. One specific example is germanium ZSM-5 (GeZSM-5).

Ion-Exchanged Zeolites

Zeolites are generally catalytically active due to acidic sites on and within the zeolitic framework. Zeolites may be rendered non-acidic through a process of exchanging acidic hydrogen atoms with alkali or alkaline earth metal. These so-called base-exchanged zeolites are non-acidic or substantially non-acidic. Exemplary alkali metals include sodium (Na), potassium (K), rubidium (Rb), cesium (Cs) and mixtures or combinations thereof. Exemplary alkaline earth metals include magnesium (Mg), calcium (Ca), strontium (Sr), barium (Ba) and mixtures and combinations thereof.

Catalysts Based on Germanium Zeolites

A catalyst of a germanium zeolite (Ge-zeolite) on which a noble metal has been deposited is base-exchanged with an alkali metal or alkaline earth metal to reduce acidity. The base-exchange may occur before or after the noble metal is deposited. The catalysts can be used to increase the octane number of natural gas condensate, light naphtha or raffinate from aromatics extraction and other refinery or chemical processes, provided such condensate, naphtha or raffinate has a predominant paraffin content. The catalysts can also be used to convert paraffins present in natural gas condensate, light naphtha, or raffinates to aromatics for extraction and chemical uses.

The silica to alumina atomic ratio ($Si:Al_2$) of the zeolite is generally between 40 and ∞. In certain embodiments of this invention, the zeolites have a $Si:Al_2$ atomic ratio ranging between 40 and 500. In other embodiments, the zeolites have a $Si:Al_2$ atomic ratio in the range from 50 to 150.

Binders

Suitable binder mixtures for making the catalysts of this invention include, without limitation, at least one solid binder selected from the group consisting of silica, alumina, magnesia, calcium oxide, and mixtures or combinations thereof; at least one colloidal binder selected from the group consisting of colloidal silica binders; and mixtures and combinations thereof. In certain embodiments, the binder mixture includes at least one solid binder selected from the group consisting of silica ($SiO_2$) binders, $Al_2O_3$ binders, MgO binders, CaO binders, and any combination thereof and at least one colloidal silica binder, where the colloidal silica binders are acid, $NH_4^+$, or $Na^+$ stabilized colloidal silicas. In other embodiments, the binder mixture includes at least one solid silica ($SiO_2$) binder and at least one colloidal silica binder, where the colloidal silica binders are acid, $NH_4^+$, or $Na^+$ stabilized colloidal silicas.

In certain embodiments, the solid binders are non-acidic or substantially non-acidic. In other embodiments, the colloidal silicas are acid stabilized ammonium $NH_4^+$) stabilized, and/or alkali metal stabilized. In other embodiments, the binder mixture includes a solid binder and a colloidal binder having particles between 10 nm and 30 nm or a solid binder and a colloidal binder mixture including at least 10 wt. % of a first colloidal binder having particles between 10 nm and 30 nm and the remainder being a second colloidal binder having particles less than 10 nm. The first colloidal binder has a particle size between 10 nm and 25 nm. In other embodiments, the first colloidal binder has a surface area less than or equal to 250 $m^2/g$. In other embodiments, the first colloidal binders have a surface area between 250 $m^2/g$ and 100 $m^2/g$.

Exemplary examples of MgO binders include hydrous magnesium aluminosilicate such as attapulgite. A commercial source of attapulgite is MIN-U-GEL®, a registered trademark of Active Minerals International, LLC and available from Active Minerals International, LLC. Exemplary examples of ammonium ion ($NH_4^+$) stabilized colloidal silica includes LUDOX® AS-40 having a particle size between 20 nm and 24 nm, LUDOX® AS-30 having a particle size of about 12 nm, acid stabilized. $SiO_2$ such as Nalco-1034A (available from Nalco Company of Naperville, Ill.) having a particle size of about 20 nm, alkali metal ion stabilized LUDOX® HS-30 having a particle size of about 12 nm and LUDOX® SM-30 having a particle size of about 7 nm, or mixtures or combinations thereof. LUDOX® is a registered trademark of Sigma-Aldrich Corporation and all LUDOX® products are available from Sigma-Aldrich Corporation.

Certain properties of the colloidal silicas used in the catalyst compositions of this invention are give in Table 1.

TABLE 1

Properties of Colloidal Silica

| Colloidal Silica | Source | % Solid | Stabilization | Surface Area $m^2/g$ | Particle Size nm |
|---|---|---|---|---|---|
| LUDOX ® AS-30 | Sigma-Aldrich | 30 | $NH_4^+$ | 217 | 12 |
| LUDOX ® AS-40 | Sigma-Aldrich | 40 | $NH_4^+$ | 143 | 20-24 |
| LUDOX ® HS-30 | Sigma-Aldrich | 30 | $Na^+$ | 220 | 12 |
| LUDOX ® SM-30 | Sigma-Aldrich | 30 | $Na^+$ | 345 | 7 |
| Nalco 1034A | Nalco | 34 | Acid | 150 | 12 |

CATALYSTS OF THIS INVENTION

In certain embodiments, the zeolites useful in this invention are medium pore zeolites. In other embodiments, the zeolites useful in this invention are large pore zeolites. In other embodiments, the zeolites are a mixture of medium and large pores zeolites. The term "medium pore" means a zeolite having an average pore size is in the range between about 5 Å and about 7 Å. The term "large pore" means a zeolite having an average pore size is in the range between about 7 Å and about 10 Å. It is possible that these ranges could overlap and a particular zeolite might be considered either a medium pore zeolite or a large pore zeolite.

Zeolites having an average pore size of less than about 5 Å, i.e., a "small pore" zeolite, are not considered to be either a medium pore zeolite or a large pore zeolite. A small pore zeolite has pores too small to permit the molecular diffusion of the molecules of the desired aromatic products, e.g., benzene, ethyl benzene, toluene and xylenes, in its pores and channels and likely is ill suited for supports for the catalysts of this invention.

Some zeolites have two distinct channels of different sizes, e.g., MOR has a 12-ring channel that is 7.0 Å×6.5 Å as well as an 8-ring channel than is <5 Å. Multichannel zeolites which have at least one channel within the ranges above for a medium pore zeolite and/or a large pore zeolite are considered within the scope of zeolites useful for the present invention.

Examples of medium pore zeolites and large pore zeolites include MFI, BEA, LTL, MOR and MTT. The foregoing list of medium pore zeolites and large pore zeolites is merely illustrative and not exhaustive, and others may be used and should be considered within the scope of the invention.

In certain embodiments, the germanium content of the zeolite useful in this invention ranges from 0.1% to 10.0% by weight. In other embodiments, the germanium content ranges from 1.0% to 6.0% by weight.

The noble metal is deposited on the zeolite by any known method of depositing a metal on a zeolite. Typical methods of depositing a metal on a zeolite are ion-exchange and impregnation. Deposition of the noble metal results in the noble metal being present not only on the surface of the zeolite, but also in the pores and channels of the zeolite. In certain embodiments, a noble metal content is present in the catalysts of this invention in a range from 0.05 wt. % to 3.0 wt. %, In other embodiments, the noble metal content is from 0.2 wt. % to 2.0 wt. %. In other embodiments, the noble metal content is from 0.2 wt. % to 1.5 wt. %. In other embodiments, the noble metal content is from 0.5 wt. % to 1.0 wt. %. Exemplary examples of the noble metal include platinum (Pt), palladium (Pd), iridium (Ir), rhodium (Rh), ruthenium (Ru) and combinations thereof. In certain embodiments, the noble metal is platinum (Pt).

The zeolite of the present invention is non-acidic. One meaning of the term "non-acidic" means a zeolite which has been base-exchanged with an alkali metal or alkaline earth metal, such as cesium, potassium, sodium, rubidium, barium, calcium, magnesium, lithium and mixtures thereof, to reduce acidity. Base-exchange may take place during synthesis of the zeolite with an alkali metal or alkaline earth metal being added as a component of the reaction mixture or may take place with a crystalline zeolite before, after or simultaneous with deposition of the noble metal. The zeolite is base-exchanged to the extent where most or all of the cations associated with aluminum are alkali metal or alkaline earth metal. In certain embodiments, a monovalent base:aluminum molar ratio in the zeolite after base exchange is at least about 0.9. In other embodiments, cesium is the alkali metal and is present in a molar ratio cesium to aluminum ranging from 1 to 2. One example of the catalyst is an aluminosilicate zeolite having germanium in the framework which has been base-exchanged such that it is non-acidic and on which platinum has been deposited, e.g., CsPt/GeZSM-5. This catalyst is sulfur tolerant up to a level of 1000 ppm in the hydrocarbon feed.

Another meaning of "non-acidic" means an aluminum-free zeolite. An aluminum-free zeolite need not be base-exchanged to be non-acidic. The aluminum-free zeolites may contain another tetravalent or trivalent element, such as titanium, iron, gallium, boron, germanium or tin. "Aluminum-free" means zeolites having an aluminum content of no more than 0.4 wt %. Within the meaning and for the purposes of the present invention, a zeolite may be "non-acidic" by exchange with a base or by having a low aluminum content.

The zeolite may contain promoters or modifiers as are known in the art. These promoters or modifiers are present in a catalytically effective amount, e.g., 0.1 wt. % to 1.0 wt. %. In certain embodiments of the catalysts of this invention, the promoters or modifiers are rhenium (Re), iridium (Ir), palladium (Pd), tin (Sn) and mixtures thereof.

The catalyst may be supported on or bound with a material, such as (1) a metal oxide; (2) a mixed metal oxide, e.g., oxides of magnesium, aluminum, titanium, zirconium, thorium, silicon or mixtures thereof; (3) a clay, e.g., kaolin or montmorillonite; (4) carbon, e.g., carbon black, graphite, activated carbon, polymers or charcoal; (5) a metal carbide or nitride, e.g., molybdenum carbide, silicon carbide or tungsten nitride; (6) zeolites; (7) a metal oxide hydroxide, e.g., boehmite, or (8) mixtures thereof added to change the physical properties of the catalyst.

PROCESSES FOR NAPHTHA AROMATIZATION

In certain embodiments, the hydrocarbon feed may contain sulfur up to 1000 ppm. In one embodiment of the invention, the hydrocarbon feed contains sulfur from 1 ppm to 500 ppm. In another embodiment of the invention, the hydrocarbon feed contains sulfur from 10 ppm to 100 ppm.

One particular example of a hydrocarbon conversion process using a zeolite catalyst is dehydrocyclization of alkanes to aromatics, e.g., $C_{6+}$ alkanes to aromatics, primarily benzene, toluene and xylenes, as disclosed in U.S. Patent Application Publication no. 2008/0255398 published Oct. 16, 2008, hereby incorporated by reference. The dehydrocyclization process promotes cyclization and dehydrogenates cyclics to their respective aromatics.

U.S. Pat. No. 6,784,333, hereby incorporated by reference, discloses a catalyst of an aluminum-silicon germanium zeolite on which platinum has been deposited. The catalyst can be used in aromatization of alkanes, specifically, aromatization of lower alkanes, such as propane. The catalyst may be a mordenite framework inverted (MFI) zeolite in which germanium is incorporated into the crystalline framework, i.e., Pt/Ge-ZSM-5. The catalyst may be sulfided before or during the aromatization process.

In certain embodiments, the present invention relates to improved catalysts for the production of benzene from light naphthas. These catalysts are specifically designed to maximize benzene production from light naphtha.

In other embodiments, the present catalyst of this invention may also be used to increase an octane number of hydrocarbons having a relatively lower octane number to hydrocarbons having a relatively higher octane number. In this mode of operation, the catalysts are designed to isomerize and hydrocyclize hydrocarbons having a relatively lower octane number to hydrocarbons having a relatively higher octane number. Nonstoichiometric examples of reaction mechanisms are shown below occurring in this mode as given below. One example is the isomerization of n-paraffins to isoparaffins, e.g.,

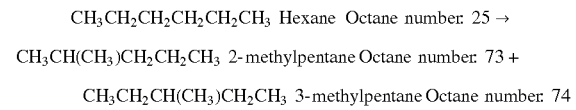

Another example is the isomerization of isoparaffins to more highly branched isoparaffins, e.g.,

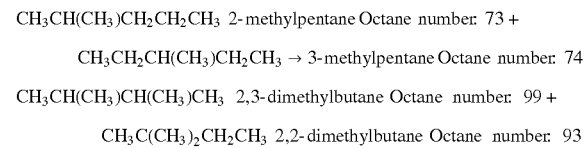

Another example is the cracking n-paraffins to smaller n-paraffins and iso-paraffins, e.g.,

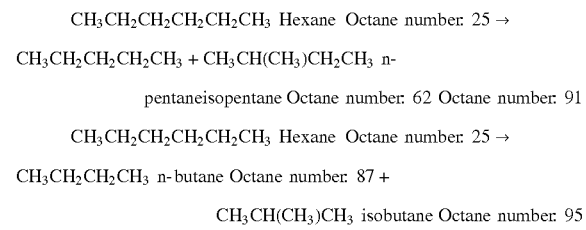

Another example is dehydrogenating both n-paraffins and iso-paraffins, e.g.,

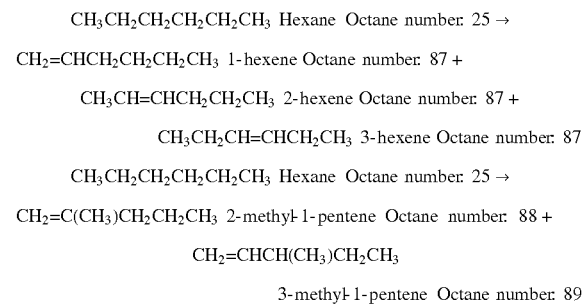

Another example is dehydrocyclizing n-paraffins to aromatics, e.g.,

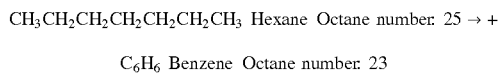

It should be noted that the chemical reactions above are not chemically balanced, but are presented to illustrate reactants and products in the processes of the present invention of converting hydrocarbons having a relatively lower octane number or lower aromatic content to hydrocarbons having a relatively higher octane number or relatively higher aromatic content.

The catalysts of the present invention are capable of concurrently functioning as isomerization, cracking, dehydrogenation, dehydrocyclization and aromatization catalysts. The octane numbers for the above hydrocarbons are numerical averages of the research octane number (RON) and the motor octane number (MON) from ASTM Special Technical Publication #225, "Knocking Characteristics of Pure Hydrocarbons", i.e., (RON+MON)/2. The aromatic contents of the above hydrocarbons are related to the amount of starting hydrocarbons that are converted into aromatics in the processes of this invention.

The process feed may contain hydrocarbons other than $C_6$-$C_{12}$ alkanes and nonhydrocarbons, i.e., compounds which are not hydrocarbons. It may contain lower alkanes, such as pentane, and higher alkanes, such as tridecane and tetradecane. The process feed may contain isoparaffins, olefins, napthenes and even aromatics. Those components of the feed which are not $C_6$-$C_{12}$ alkanes may be hydrocarbons that catalytically react or hydrocarbons or nonhydrocarbons that are catalytically nonreactive or inert, such as diluents. In certain embodiments, the process feeds are naphthas having at least 30% $C_6$-$C_{12}$ alkanes. In other embodiments, the process feeds are naphthas having at least 40% $C_6$-$C_{12}$ alkanes. In other embodiments, the process feeds are naphthas having at least 50% $C_6$-$C_{12}$ alkanes.

The aromatization process may be carried out at a liquid hourly space velocity in the range between 0.1 $h^{-1}$ and 100 $h^{-1}$, at a temperature higher than 450° C. and at a pressure in the range between 1 psia and 315 psia. The resulting aromatized hydrocarbon product has an octane number of at least 75. In other embodiments, the hydrocarbon product has an octane number of at least 80. In other embodiments, the hydrocarbon product has an octane number of at least 85.

EXPERIMENTS OF THE INVENTION

Having generally described the invention, the following examples are given as particular illustrative embodiments of the invention and to demonstrate the practice and advantages and differences thereof. It is understood that the examples are given by way of illustration and are not intended to limit the specification or the claims to follow in any manner.

Catalyst Preparation

One embodiment of the catalyst synthesis for light naphtha aromatization catalysts of this invention broadly includes following steps: (a) obtaining or synthesizing a GeZSM-5 zeolite and detemplating the GeZSM-5 zeolite; (b) ion-exchanging the GeZSM-5 zeolite with Cs to form a non-acidic Cs/GeZSM-5 zeolite and impregnating the non-acidic Cs/GeZSM-5 zeolite with Pt by a wet-incipient method to form a CsPt/GeZSM-5 zeolite; and (c) forming the CsPt/GeZSM-5 zeolite into an extrudate. The steps (b) and (c) may be done in reversed order. In the examples given herein, an as-synthesized GeZSM-5 zeolite material was heated to a temperature between 500° C. and 550° C. in air to remove organic template sometimes, the detemplating step. The detemplated GeZSM-5 zeolite material was then repeatedly ion-exchanged with $Cs^+$ ions using an aqueous cesium nitrate ($CsNO_3$) solution until the GeZSM-5 zeolite material is non-acidic to form a Cs/GeZSM-5 zeolite material. The non-acidic Cs/GeZSM-5 zeolite material was then dried at a temperature between 280° C. and 320° C. Pt was added to the Cs/GeZSM-5 zeolite material via a wet-incipient method using an aqueous solution of a Pt-compound such as tetraamine platinum nitrate [$(NH_3)_4Pt(NO_3)_2$] or chloroplatinic acid [$H_2PtCl_6 \cdot 6H_2O$)] to form a CsPt/GeZSM-5 zeolite material. The CsPt/GeZSM-5 zeolite material was then heated at temperatures between 250° C. and 530° C. resulting in an active CsPt/GeZSM-5 catalyst in powder form. The CsPt/GeZSM-5 powder catalyst was mixed with a binder mixture forming a bound CsPt/GeZSM-5 zeolite catalyst. The bound CsPt/GeZSM-5 zeolite catalyst was then extruded to form extruded CsPt/GeZSM-5 zeolite catalyst. In the examples disclosed herein, the extruded bound CsPt/GeZSM-5 zeolite catalysts are in the form of ⅛-inch cylindrical shaped extrudates. The CsPt/GeZSM-5 zeolite powder catalysts, the bound CsPt/GeZSM-5 zeolite powder catalysts, and the extruded bound CsPt/GeZSM-5 zeolite catalysts having specific compositions were then calcined at temperatures between 300° C. and 530° C.

Embodiments of the methods of the present invention generally include the steps of: (1) obtaining a GeZSM-5 zeolite; (2) detemplating the GeZSM-5 zeolite; (3) ion-exchanging the GeZSM-5 zeolite with Cs to form a non-acidic Cs/GeZSM-5 zeolite; (4) drying the non-acidic Cs/GeZSM-5 zeolite; (5) impregnating the non-acidic Cs/GeZSM-5 zeolite with Pt by a wet-incipient method to form a CsPt/GeZSM-5 zeolite; (6) mixing the CsPt/GeZSM-5 zeolite with a binder mixture to form a bound CsPt/GeZSM-5 zeolite; and (7) calcining the bound CsPt/GeZSM-5 zeolite to form a bound CsPt/GeZSM-5 zeolite catalyst. The methods may also include the step of, prior to calcining, extruding the bound CsPt/GeZSM-5 zeolite catalyst to form an extruded bound CsPt/GeZSM-5 zeolite catalyst.

Materials used for Pt impregnation and for CsPt/GeZSM-5 binding for each catalyst are given in Table 2. The catalysts were analyzed for Si, Al, Ge, Cs and Pt content and the results are shown in Table 3. Specific examples are given here to describe catalyst formation and catalyst performance.

Cs Ion-Exchange

As-synthesized GeZSM-5 zeolite was first detemplated at a temperature of 530° C. for 10 h in air to remove organic template, and then ion-exchanged with $Cs^+$ ion in an aqueous solution. For example, 277 g detemplated GeZSM-5 zeolite powder was ion-exchanged with 0.5 M $CsNO_3$ aqueous solution (slurry total volume 1900 mL) at about 100° C. for 2 h. The slurry was filtered and zeolite was washed with deionized (DI) water and GeZSM-5 zeolite was then dried at room temperature. The Cs ion-exchange was repeated and the Cs ion-exchanged GeZSM-5 powder was dried at 300° C. in air for 10 h. Generally, the Cs ion-exchange treatment is continued until the GeZSM-5 zeolite is non-acidic to form a non-acidic Cs/GeZSM-5 zeolite.

Addition of Pt

In all examples disclosed herein (see Table 2), Pt was added to the Cs/GeZSM-5 zeolite by using a wet-incipient method. As an example, Catalyst B is given here to describe the method. 5.63 g of tetraamine platinum nitrate was dissolved in 106 mL deionized water and the Pt-salt solution was slowly added to 275.84 g of the Cs/GeZSM-5 zeolite powder and mixed well. An additional 134.36 g water was sprayed to the zeolite mixture to moisten the powder homogeneously, which was then calcined at 300° C. in air for 10 h.

CsPt/GeZSM-5 Mixed with Binding Agent

Catalysts C-G and U contained zeolite and binder mixture; however, they were not extruded. As an example, Catalyst F is given here to describe the preparation method. 3.00 g of Cs/GeZSM-5 zeolite powder were mixed with 1.36 g of silica (ULTRASIL® VN3 SP, available from Degussa Corporation, ULTRASIL® is a registered trademark of Degussa Corporation), to which was added 5.21 g colloidal silica (LUDOX® AS-40, Sigma-Aldrich, containing 40 wt % solid) and mixed well. 2.3 g of deionized water were added to the zeolite mixture. The mixed material was hand-rolled and calcined at 300° C. for 10 h in air.

Extrusion of CsPt/GeZSM-5 with $SiO_2$, & Colloidal Silica Binders

Extruded Catalysts H-O were made by using CsPt/GeZSM-5, $SiO_2$ and colloidal silicas such as LUDOX® AS-40, or LUDOX® SM-30, or LUDOX® AS-30, or LUDOX® HS-30, or Nalco 1034A (see Table 2 for composition). As an example, Catalyst H is given here to describe preparation method. 40.07 g of CsPt/GeZSM-5 powder were mixed with 3.44 g ULTRASIL® and 40.75 g LUDOX® AS-40 to form an extrudable mixture and extruded with a lab B-B gun extruder (Bonnot) to form ⅛-inch cylindrical extrudate. The extrudate was calcined at 300° C. for 10 h in air. No water was added to the mixture for this sample. However, in some cases water was added to make an extrudable mixture (see Table 2).

Extrusion of CsPt/GeZSM-5 with $Al_2O_3$ Binder

Catalysts P-S were extruded with alumina or alumina and silica as binder. Catalyst R is given here as an example to describe the preparation. 6.66 g $Al_2O_3$ (a pseudoboehmite type obtained from BASF, Q2436) were treated with 2.88 g of $HNO_3$ (70% in aqueous) and then mixed with 40.0 g CsPt/GeZSM-5 zeolite powder. 14.84 g colloidal silica (Nalco-1034A, acid stabilized, containing 34% solid) were sprayed onto the zeolite-alumina mixture, and mixed with it. 8.2 g of deionized water were sprayed to make the zeolite-alumina into an extrudable mixture, which was then extruded to form ⅛-inch extrudates. The extrudate was calcined at 300° C.

Extrusion of CsPt/GeZSM-5 with MUG & LUDOX® AS-30 (Example Catalyst T)

40.04 g of CsPt/GeZSM-5 powder were mixed with 2.21 g MIN-U-GEL® (MUG) and 32.8 g LUDOX® AS-30 (colloidal silica 30 wt % solid in aqueous) to form an extrudable mixture and extruded to form ⅛-inch cylindrical shaped extrudate. The typical composition of MUG (obtained from Active Minerals International) is (wt %): 66% $SiO_2$, 11.71% $Al_2O_3$, 9.70% MgO, 4.02% $Fe_2O_3$, 0.55% $TiO_2$, 0.99% $P_2O_5$, 2.92% CaO, 1.07% $K_2O$, 2.57% $CO_2$, 0.25% $SO_4$. The extrudate was calcined at 300° C. for 10 h in air.

Extrusion of CsPt/GeZSM-5 with $SiO_2$ & Mixed LUDOX® (Example Catalyst V)

Catalyst V and Catalyst W were extruded with $SiO_2$ and a mixture of LUDOX® AS-30 and SM-30. Catalyst V is used here as an example to describe the method. 40.08 g of CsPt/GeZSM-5 powder were mixed with 2.06 g $SiO_2$ (ULTRASIL® VN3 SP) and 33.0 g mixed colloidal $SiO_2$ (LUDOX® AS-30 and SM-30, both obtained from Aldrich-Sigma, mixed at weight ratio 20/80) to form an extrudable mixture and extruded to form ⅛-inch cylindrical shaped extrudate. The extrudate was calcined at 300° C. for 10 h in air. In alternate formulations, the $SiO_2$ may contain MIN-U-GEL® (MUG).

Below in Table 2 are shown materials used in Pt impregnation of Cs/GeZSM-5 and used in CsPt/GeZSM-5 binding using a binder mixture for extruding into a shaped catalyst. Unless stated otherwise all catalyst materials in Table 2 were calcined at 300° C. with air flow. All of the quantities listed in Table 2 are given in grams.

TABLE 2

Catalyst Preparation Details [1, 2, 3]

| | Pt-impregnation | | | CsPt/GeZSM-5 Binding | | | | | | |
|---|---|---|---|---|---|---|---|---|---|---|
| | | | | | Silica | | | | | |
| Cat. | Zeolite | Pt-salt | H₂O | Zeolite | Solid | Colloidal | Al₂O₃ | HNO₃ | H₂O | Comment |
| A | 20.00 | 0.40 | 18.58 | | | | | | | Calc 530° C. |
| B | 275.84 | 5.63 | 240.36 | | | | | | | |
| C | 40.00 | 0.81 | 39.74 | 5.0 | 1.46 ULTRASIL ® | 5.61 LUDOX ® AS-40 | | 4.1 | | Step 3 Calc 250° C. |
| D | 20.01 | 0.40 | 19.59 | 4.00 | 0.68 ULTRASIL ® | 2.61 LUDOX ® AS-40 | | | 4.1 | |
| E | 50.02 | 1.00 | 49.40 | 3.50 | 1.02 ULTRASIL ® | 3.92 LUDOX ® AS-40 | | | 2.4 | |
| F | 50.02 | 1.00 | 49.40 | 3.00 | 1.36 ULTRASIL ® | 5.21 LUDOX ® AS-40 | | | 2.3 | |
| G | 20.02 | 0.40 | 18.58 | 4.02 | 0.69 ULTRASIL ® | 2.60 LUDOX ® AS-40 | | | 3.9 | Step 3&4 Calc 530° C. |
| H | 199.87 | 4.01 | 179.48 | 40.07 | 3.44 ULTRASIL ® | 40.75 LUDOX ® AS-40 | | | 0 | |
| I | 100.10 | 2.01 | 98.67 | 35.03 | 10.21 ULTRASIL ® | 39.18 LUDOX ® AS-40 | | | 20.2 | |
| J | 100.10 | 2.01 | 98.67 | 35.09 | 15.44 ULTRASIL ® | 60.87 LUDOX ® AS-40 | | | 17.6 | |
| K | 200.76 | 4.05 | 187.64 | 40.03 | 3.42 ULTRASIL ® | 41.1 LUDOX ® SM-30 | | | 0 | |
| L | 275.84 | 5.63 | 240.36 | 39.64 | 3.46 ULTRASIL ® | 38.2 LUDOX ® AS-30 | | | 0 | |
| M | 200.76 | 4.05 | 187.64 | 39.64 | 3.45 ULTRASIL ® | 39.3 LUDOX ® HS-30 | | | 0 | |
| N | 275.84 | 5.63 | 240.36 | 39.65 | 3.46 ULTRASIL ® | 39.3 LUDOX ® HS-30 | | | 0 | |
| O | 200.76 | 4.05 | 187.64 | 40.06 | 3.41 ULTRASIL ® | 46 Nalco 1034A | | | 0 | |
| P | 416.81 | 8.40 | 392.84 | 40.04 | | | 13.37 | 2.87 | 25.3 | Hi-Q10 |
| Q | 416.81 | 8.40 | 392.84 | 40.04 | 5.36 ULTRASIL ® | | 7.00 | 2.88 | 25.7 | Hi-Q10 |
| R | 416.81 | 8.40 | 392.84 | 40.0 | | 14.84 Nalco 1034A | 6.66 | 2.88 | 8.2 | Hi-Q10 |
| S | 416.81 | 8.40 | 392.84 | 40.0 | | 22.09 Nalco 1034A | 3.33 | 2.88 | 5.2 | Hi-Q10 |
| T | 205.08 | 4.12 | 197.12 | 40.04 | 2.21 MUG | 32.8 LUDOX ® AS-30 | | | 0 | |
| U | 205.08 | 4.12 | 197.12 | 5.00 | 0.40 MUG | 4.50 Nalco 1034A | | 0.22 | | |
| V | 205.08 | 4.12 | 197.12 | 40.08 | 2.06 ULTRASIL ® | 33 LUDOX ® AS-30 + SM-30 20/80 wt ratio | | | | |
| W | 217.95 | 4.40 | 186.6 | 36.03 + 4.45[4] | 2.01 ULTRASIL ® | 35.9 LUDOX ® AS-30 + SM-30 40/60 wt ratio | | | | 0.085 Pt-salt added |

[1] Weights were as-is basis. LOI of CsPt/GeZSM-5 1 wt %, ULTRASIL ® 7 wt %, MUG 13 wt %.
[2] ULTRASIL ® silica was a high purity (98%) silica obtained from Degussa (VN3 SP); Min-u-gel (MUG) contained 66 wt % Al2O3 and other oxides (see text). Alumina was a pseudoboehmite type and was obtained from BASF (Q2436); Colloidal silica AS-40 (40 wt % solid), AS-30 (30 wt % solid) and SM-30 (30 wt % solid) were obtained from Aldrich-Sigma; Nalco-1034A (34 wt % solid) was obtained from Nalco.
[3] Unless stated otherwise all samples were calcined at 300° C. in air.
[4] Templated or raw Zeolite.

Table 3 tabulates elemental analyses of these catalysts including crush strengths of the extruded catalysts.

TABLE 3

Catalyst Composition

| | | | Analysis, wt % | | | | | Crush Strength |
|---|---|---|---|---|---|---|---|---|
| Cat. | Binder | % Binder | Si | Al | Ge | Cs | Pt | lb/min |
| A | None | | 40.49 | 0.79 | 4.38 | 5.40 | 0.93 | |
| B | None | | 39.23 | 0.71 | 4.71 | 5.43 | 0.82 | |
| C | ULTRASIL ® SiO₂ & LUDOX ® AS-40 | 41.8 | 42.30 | 0.41 | 2.58 | 3.01 | 0.56 | |
| D | ULTRASIL ® SiO₂ & LUDOX ® AS-40 | 29.5 | 42.41 | 0.54 | 3.23 | 3.90 | 0.65 | |
| E | ULTRASIL ® SiO₂ & LUDOX ® AS-40 | 41.8 | 42.39 | 0.43 | 2.59 | 3.13 | 0.55 | |
| F | ULTRASIL ® SiO₂ & LUDOX ® AS-40 | 52.7 | 43.42 | 0.36 | 2.09 | 2.64 | 0.45 | |
| G | ULTRASIL ® SiO₂ & LUDOX ® AS-40 | 29.4 | 42.06 | 0.66 | 3.23 | 3.90 | 0.68 | |
| H | ULTRASIL ® SiO₂ & LUDOX ® AS-40 | 32.7 | 42.38 | 0.50 | 3.03 | 3.72 | 0.63 | 1.72 |
| I | ULTRASIL ® SiO₂ & LUDOX ® AS-40 | 41.8 | 42.52 | 0.50 | 2.60 | 2.87 | 0.57 | 0.49 |
| J | ULTRASIL ® SiO₂ & LUDOX ® AS-40 | 52.4 | 43.68 | 0.35 | 2.12 | 2.46 | 0.46 | 1.06 |
| K | ULTRASIL ® SiO₂ & LUDOX ® SM-30 | 27.9 | 41.26 | 0.50 | 3.41 | 3.42 | 0.69 | 2.22 |
| L | ULTRASIL ® SiO₂ & LUDOX ® AS-30 | 27.0 | 42.11 | 0.58 | 3.56 | 3.85 | 0.74 | 1.15 |
| M | ULTRASIL ® SiO₂ & LUDOX ® HS-30 | 27.5 | 41.39 | 0.50 | 3.32 | 3.37 | 0.70 | 1.16 |
| N | ULTRASIL ® SiO₂ & LUDOX ® HS-30 | 26.6 | 41.34 | 0.54 | 3.70 | 3.70 | 0.78 | 1.01 |
| O | ULTRASIL ® SiO2, Nalco-1034A | 31.9 | 41.72 | 0.51 | 3.38 | 3.40 | 0.73 | 1.01 |
| P | HNO₃ treated Al₂O₃ | 20.0 | 31.68 | 10.95 | 3.78 | 3.74 | 0.78 | 3.12 |
| Q | HNO₃ treated Al₂O₃ & SiO₂, | 20.0 | 35.68 | 6.22 | 3.69 | 3.73 | 0.78 | 2.12 |
| R | HNO₃ treated Al₂O₃ + SiO₂ & Nalco-1034A | 20.0 | 35.95 | 5.90 | 3.70 | 3.64 | 0.78 | 2.90 |
| S | HNO₃ treated Al₂O₃ + SiO₂ & Nalco-1034A | 20.0 | 38.53 | 3.28 | 3.72 | 3.76 | 0.79 | 1.97 |
| T | MUG & LUDOX ® AS-30 SiO₂ | 22.7 | 40.11 | 0.76 | 3.39 | 4.23 | 0.75 | 1.08 |
| U | HNO₃ treated MUG + SiO₂ & Nalco-1034A | 27.3 | 39.97 | 0.83 | 3.26 | 3.98 | 0.72 | |

TABLE 3-continued

| | | | Catalyst Composition | | | | | | |
|---|---|---|---|---|---|---|---|---|---|
| | | | | Analysis, wt % | | | | | Crush Strength |
| Cat. | Binder | % Binder | Si | Al | Ge | Cs | Pt | lb/min |
| V | ULTRASIL ® SiO$_2$, Mixed LUDOX ® AS-30/SM-30 (20/80 wt ratio) | 24.0 | 41.01 | 0.58 | 3.43 | 4.33 | 0.72 | 1.83 |
| W | ULTRASIL ® SiO$_2$, Mixed LUDOX ® AS-30/SM-30 (40/60 wt ratio) | 24.0 | 41.58 | 0.55 | 3.71 | 3.33 | 0.81 | 2.04 |

Reactor Set Up

The catalysts were tested in a testing unit including 5 reactor tubes. The tubes were ¼ 316 stainless steel with a 0.035" wall. All reactors were housed in an aluminum block to ensure that all of the tube saw the same temperature. During testing, all tubes received the same feed. Sampling was performed using a gas chromatography instrument (GC) installed with a dimethyl polysiloxane capillary column and using a flame ionization detector (FID). The reaction pressure was atmospheric for all tests.

Catalyst Loading

The catalysts were normally sized between 20 mesh and 40 mesh and diluted with 30 grit SiC. The normal catalyst loadings in the tubes were 0.125 gram active catalyst. If the catalysts were formed with a binder, the loadings were modified to keep the zeolite loading constant. The SiC grit was added to make up a 2 mL volume bed. The bed was centered in the reactor tube and supported on a plug of quartz wool.

Catalyst Testing

After loading and pressure testing, the testing unit was heated up to a temperature of 200° C. for 1 hour. A hydrogen gas flow of 25 sccm was divided across the five reactor tubes. The temperature was then raised to 460° C. for 1 hour under the same hydrogen flow. Next, reagent grade n-hexane (99%+) was added at a flow rate of 7.14 grams/hour divided across the five reactors and the temperature raised to a temperature of 515° C. Reactor effluent was analyzed to determine the n-hexane conversion and selectivity. Conversion was defined as the fraction of n-hexane feed converted to benzene, $C_{1-5}$ products, and $C_{7+}$ products. Selectivity was defined as the sum of the amounts of benzene, toluene, and xylenes produced divided by the amount of feed converted to benzene, $C_{1-5}$ products, and $C_{7+}$ products.

Testing Results

The light naphtha aromatization reaction results are tabulated in Table 4.

TABLE 4

Light Naphtha Aromatization Catalyst Performance Data

| Cat[1] | Form | T(° C.) @ Step 3 | T(° C.) @ Step 4 | Crush lb/mm | % Conv @ 50 h | % Sel @ 50 h |
|---|---|---|---|---|---|---|
| A | powder | 530 | NA | | 8.6 | 82 |
| B | powder | 300 | NA | | 19.2 | 93.1 |
| C | with binder | 250 | 300 | | 17.6 | 93.3 |
| D | with binder | 300 | 300 | | 18.7 | 92.4 |
| E | with binder | 300 | 300 | | 18.0 | 93.5 |
| F | with binder | 300 | 300 | | 17.7 | 93.8 |
| G | with binder | 530 | 530 | | 7 | 87.6 |
| H | extrudate | 300 | 300 | 1.72 | 18.5 | 92.7 |
| I | extrudate | 300 | 300 | 0.49 | 19.0 | 93.5 |
| J | extrudate | 300 | 300 | 1.06 | 18.3 | 93.8 |
| K | extrudate | 300 | 300 | 2.22 | 12.4 | 91.9 |
| L | extrudate | 300 | 300 | 1.15 | 19.0[†] | 93.1[†] |
| M | extrudate | 300 | 300 | 1.16 | 16.4 | 93.0 |
| N | extrudate | 300 | 300 | 1.01 | 15.4 | 93.8[†] |
| O | extrudate | 300 | 300 | 1.01 | 18.5 | 92.8 |
| P | extrudate | 300 | 300 | 3.12 | 10.1 | 87.2 |
| Q | extrudate | 300 | 300 | 2.12 | 9.3 | 85.7 |
| R | extrudate | 300 | 300 | 2.90 | 8.7 | 85.2 |
| S | extrudate | 300 | 300 | 1.97 | 7.8 | 80.7 |
| T | extrudate | 300 | 300 | 1.08 | 19.1 | 92.3 |
| U | with binder | 300 | 300 | | 13.9 | 90.0 |
| V | extrudate | 300 | 300 | 1.83 | 16.8 | 93.0 |
| W | extrudate | 300 | 300 | 2.04 | 18.5 | 93.9 |

[1]Catalysts A, B contained no binder, catalysis B-G and U contained binder but not extruded.
[†]Catalyst activity and selectivity @40 h on stream.

The data showed that CsPt/GeZSM-5 catalysts (without binder) calcined at a temperature around 300° C. or less gave a $C_6$-hydrocarbon conversions (at around 50 h on stream) about 19% and aromatics selectivity about 93% (see Catalyst B in Table 4). However, when the catalyst was calcined at a temperature around 530° C. or higher, the catalyst showed only 8% conversion with 82% selectivity (see Catalyst A in Table 4).

By adding 20-60% binder or binder mixture in the active powder catalyst, hand-pressed and calcined at around 300° C., the catalyst showed comparable catalytic performances (see Catalysts C-F). The active catalyst materials were then formed into shapes to form shaped catalysts by mixing the catalysts with a binder or a binder mixture and extruding into cylindrical shaped catalysts. The catalysts having good performance included catalyst including SiO$_2$ binders, or SiO$_2$ containing other refractive oxides such as $Al_2O_3$ binders, MgO binders, CaO binders, etc. (e.g., commercially obtained as Min-u-Gel) plus colloidal silica gel that have been stabilized with ammonium ions ($NH_4^+$) such as LUDOX® AS-40, LUDOX® AS-30, or $Na^+$ stabilized LUDOX® HS-30, or mixtures thereof or acid stabilized $SiO_2$ such as Nalco-1034A, all having particle sizes between 10 nm and 25 nm. The data further showed that catalysts having poor performance included catalysts including (i) $Al_2O_3$ binders or $Al_2O_3+SiO_2$ binders, particularly when the alumina was treated with $HNO_3$ (Catalyst P, Catalyst Q, and Catalyst R) or (ii) $SiO_2$ binders and colloidal silica stabilized with alkali metals such as $Na^+$, e.g., LUDOX® SM-30 having a particle size of about 7 nm (Catalyst K).

By having certain combinations of binder mixtures the mechanical strength of the extruded catalysts may be improved significantly without sacrificing catalytic performance. Such examples include $SiO_2$ binders, mixtures of $SiO_2$ binders, or binders including $SiO_2$ and other refractive oxides such as $Al_2O_3$ binders, MgO binders, CaO binders, etc. (e.g., Min-u-gel) and mixture of colloidal silica having particle sizes between 10 nm and 25 nm (e.g., LUDOX® AS-40, LUDOX® AS-30) and colloidal silica having particle sizes of about 7 nm (e.g., SM-30) (see Catalyst V and Catalyst W). Such binders present in concentration of about 24 wt % binder in the catalysts showed 1.8 to 2.0 lb/mm crush strength and showed catalytic performances comparable to the active powder catalysts without the binder (compare Catalyst V and Catalyst W with Catalyst B).

The crush strength of the extruded Catalyst H, Catalyst-J, Catalysts M-O, Catalyst T and Catalysts V-W are between 1.0 lb/min and 2.2 lb/mm, except of Catalyst I, which was one of the early catalyst preparations and was made with too much water during extrusion. The crush strengths of the catalysts of this invention generally should have a crush strength at least 1.0 lb/mm. In other embodiments, the crush strength is at least 1.25 lb/mm. In other embodiments, the crush strength is at least 1.50 lb/mm. In other embodiments, the crush strength is at least 1.75 lb/mm. In other embodiments, the crush strength is at least 2.00 lb/mm.

Referring now to FIG. 1, a plot of the catalyst performance characteristics of Catalyst A and Catalyst B are shown. From the data, it is clear the unbound Catalyst B, calcined prior to testing at 300° C., out-performed the unbound Catalyst A, calcined prior to testing at 530° C. Thus, calcining an unbound catalyst above 500° C. has a detrimental effect on catalyst performance characteristics (% conversion and % selectivity), while calcining an unbound catalyst at 300° C., produced a catalyst with desirable catalyst performance characteristics.

Figure 2:
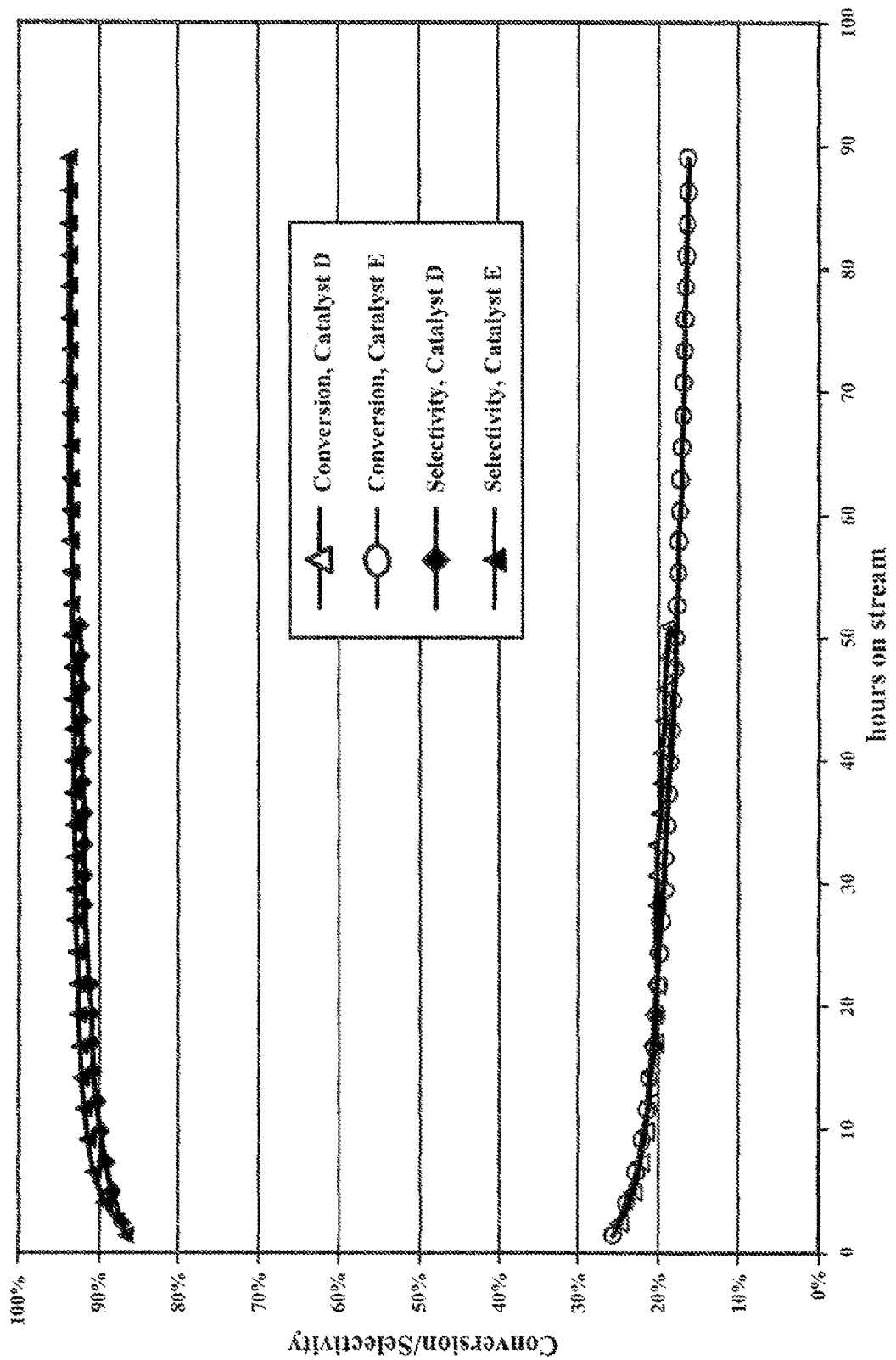
FIG. 2 depicts a plot of the catalyst performance of Catalyst D and E.

Referring now to FIG. 2, a plot of the catalyst performance characteristics of Catalyst D and Catalyst E are shown. From the data, it is clear that increasing the binder content by about 50% from about 30 wt. % binder to about 42 wt. % binder did not alter the performance characteristics of the catalysts.

Figure 3:
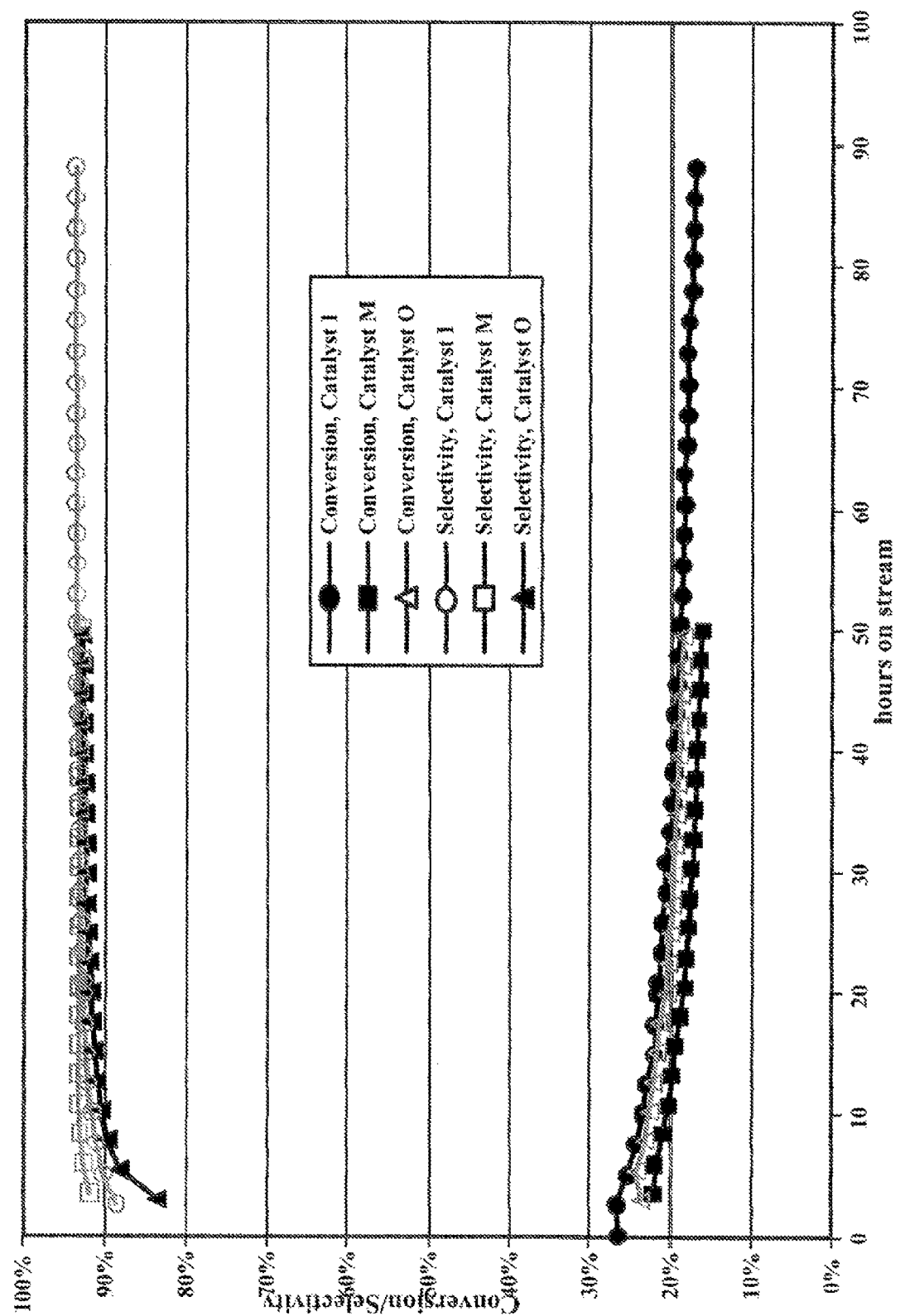
FIG. 3 depicts a plot of the catalyst performance of Catalyst I, M and O.

Referring now to FIG. 3, a plot of the catalyst performance characteristics of Catalyst I, Catalyst M and Catalyst O are shown. From the data, it is clear that the binder mixtures including a solid silica and a colloidal silica, where the colloidal silica has a particle size between 10 nm and 30 nm produce catalysts with good catalyst properties, good catalyst stability and, with the exception of Catalyst I (prepared with too much water), adequate crush strength. Catalyst I used LUDOX® AS-40 as the colloidal silica having particles between 20 nm and 24 nm; Catalyst M used LUDOX® HS-30 having particles of 12 nm; and Catalyst O used Nalco-1034A having particles of 12 nm.

Figure 4:
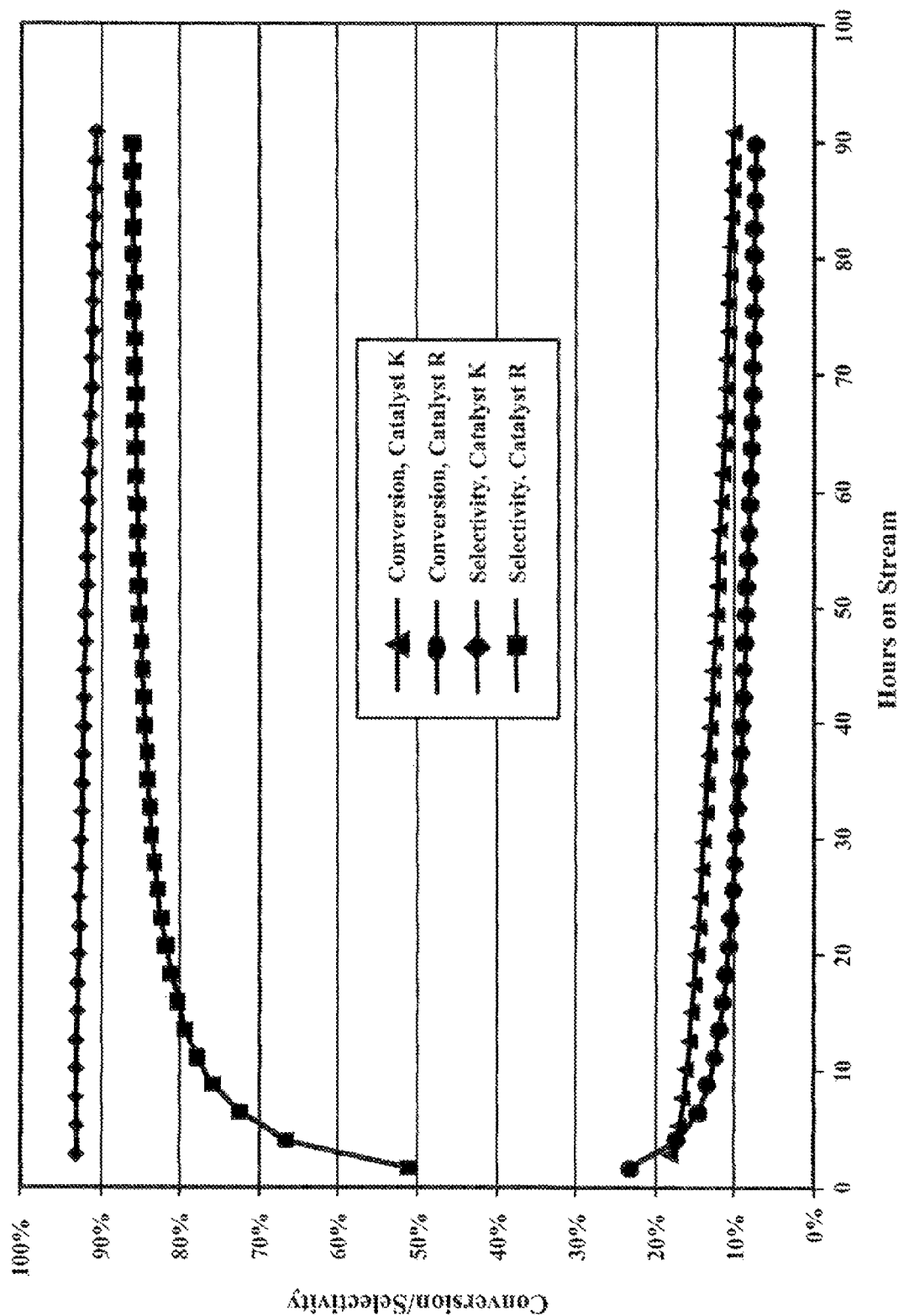
FIG. 4 depicts a plot of the catalyst performance of Catalyst K and R.

Referring now to FIG. 4, a plot of the catalyst performance characteristics of Catalyst K and Catalyst R is shown. The data showed that Catalyst K, which was made using LUDOX® SM-30, a colloidal silica having particles of 7 nm, produced a catalyst having unacceptable performance characteristics—activity less than at least 15% (12.4). The data also showed that Catalyst R, which used a binding mixture including an acid treated alumina and a silica, also produced a catalyst having unacceptable performance characteristics—an activity less than at least 15% (8.7) and a selectivity less than at least 92%. Thus, binder mixtures including solid silica and a low particle size colloidal silica (particles less than 10 nm) and binder mixtures including a solid silica and an acid treated binder, produce catalyst having unacceptable catalyst performance characteristics.

Figure 5:
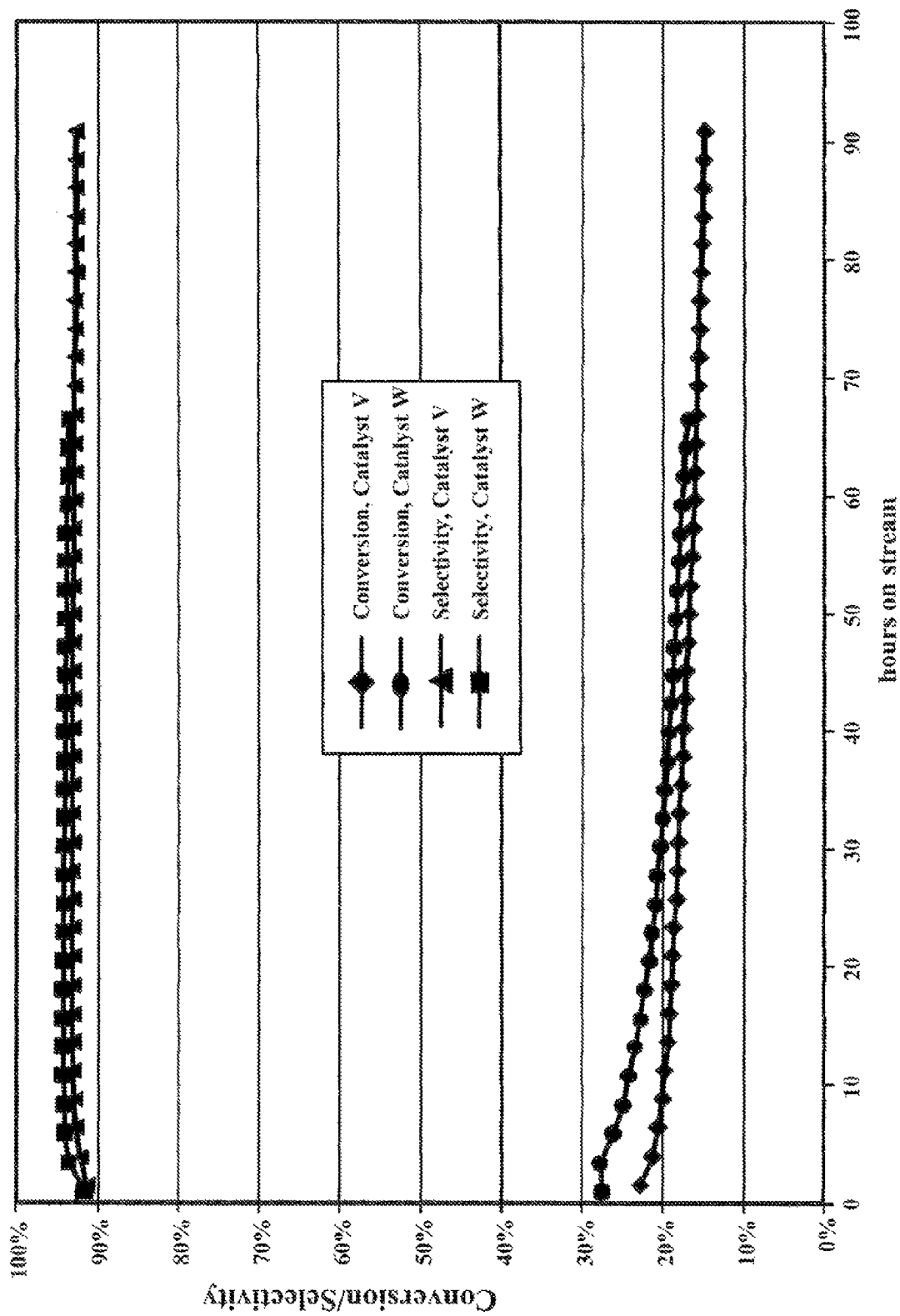
FIG. 5 depicts a plot of the catalyst performance of Catalyst V and W.

Referring now to FIG. 5, a plot of the catalyst performance characteristics of Catalyst V and Catalyst W is shown. The data showed that catalysts prepared using a binder mixture including a solid silica and a mixture of a colloidal silica having particles of at least 10 nm and a colloidal silica having particles of less than 10 nm, produced catalysts having acceptable catalyst performance characteristics. Catalyst V was prepared using a mixture of colloidal silica including 20 wt. % of a colloidal silica having particles of at least 10 nm and 80 wt. % of a colloidal silica having particles of less than 10 nm; while Catalyst W was prepared using a mixture of colloidal silica including 40 wt. % of a colloidal silica having particles of at least 10 nm and 60 wt. % of a colloidal silica having particles of less than 10 nm.

The catalyst performance data for catalysts having acceptable catalytic performance characteristics of activity and selectivity also showed acceptable stability on stream for at least 60 hours, some up to 90 hours. Additionally, except for Catalyst I, all these catalysts have adequate crush strength. Again, the inventors believe that the low crush strength of Catalyst I was due to the presence of too much water in the material during extrusion.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

We claim:

1. A process for preparing a naphtha aromatization catalyst comprising:
   preparing a detemplated germanium ZSM-5 material from a germanium ZSM-5 material containing a templating agent by a) or b)
      a) detemplating germanium ZSM-5 material containing the templating agent under a detemplating time/temperature protocol sufficient to remove all or substantially all of the templating agent in the germanium ZSM-5 material to form the detemplated germanium ZSM-5 material, where the detemplating time/temperature protocol includes a detemplating time period between 1 hour and 12 hours at a detemplating temperature between 400° C. and 600° C.; or
      b) adding between 20 wt. % to 60 wt. % of a binder composition to the germanium ZSM-5 material containing the templating agent to form a bound germanium ZSM-5 material, shaping the bound germanium ZSM-5 material, and calcining the bound germanium ZSM-5 material for a time period between 1 hour and 12 hours at a calcining temperature between 400° C.

and 600° C. to form the detemplated germanium ZSM-5 material; and thereafter, performing steps (i) and (ii) in any order
  (i) ion-exchanging the detemplated germanium ZSM-5 material with a cesium (Cs) containing solution, where said step of ion-exchanging is performed at an ion-exchanging temperature between room temperature and 100° C.;
  (ii) impregnating the detemplated germanium ZSM-5 material with platinum (Pt); and forming the naphtha aromatization catalyst by heating according to I) and II)
  I) heating the detemplated germanium ZSM-5 material immediately after step (i) according to a cesium heating time/temperature protocol, where the cesium heating time/temperature protocol includes a cesium heating time between 1 hour and 12 hours at a cesium heating temperature from 250° C. to 300° C., and heating the detemplated germanium ZSM-5 material immediately after step (ii) according to a platinum heating time/temperature protocol, where the platinum heating time/temperature protocol includes a platinum heating time between 1 hour and 12 hours at a platinum heating temperature ranging from 250° C. to less than 500° C. to form the naphtha aromatization catalyst; or
  II) after performing both steps (i) and (ii), heating the detemplated germanium ZSM-5 material according to a cesium-platinum heating time/temperature protocol to form the naphtha aromatization catalyst, where the cesium-platinum heating time/temperature protocol includes a cesium-platinum heating time between 1 hour and 12 hours at a cesium-platinum temperature ranging from 250° C. to less than 500° C.;

with the proviso that if the process is performed using step (a), the following additional steps (1) and (2) must be performed after step (a)
  (1) adding between 20 wt. % to 60 wt. % of the binder composition to the detemplated germanium ZSM-5 material and shaping the detemplated germanium ZSM-5 material; and,
  (2) calcining the detemplated germanium ZSM-5 material from step (1) according to a bound calcining time/temperature protocol including a bound calcining time period between 1 hour and 12 hours at a bound calcining temperature less than or equal to 500° C.; and wherein the binder composition comprises
  a solid binder and a colloidal binder having particles between 10 nm and 30 nm, or
  the solid binder and a mixture of colloidal binders including at least 10 wt. % of a first colloidal binder having particles between 10 nm and 30 nm and the remainder being a second colloidal binder having particles less than 10 nm.

2. The process of claim 1, wherein the impregnating is a wet-incipient impregnating step.

3. The process of claim 1, further comprising repeating the ion-exchanging at least once.

4. The process of claim 1, wherein the shaping forms a shaped body, and wherein the shaped body comprises ⅛-inch extrudates.

5. The process of claim 1, wherein the detemplating temperature is between 425° C. and 600° C.; the cesium heating temperature is between 250° C. and 350° C.; the platinum heating temperature is less than or equal to 450° C., and the bound calcining temperature is less than or equal to 450° C.

6. The process of claim 1, wherein the detemplating temperature is between 450° C. and 600° C.; the cesium heating temperature is between 250° C. and 300° C.; the platinum heating temperature is less than or equal to 400° C., and the bound calcining temperature is less than or equal to 400° C.

7. The process of claim 1, wherein the detemplating temperature is between 475° C. and 600° C.; the cesium heating temperature is between 275° C. and 325° C.; the platinum heating temperature is less than or equal to 350° C., and the bound calcining temperature is less than or equal to 350° C.

8. The process of claim 1, wherein the detemplating temperature is between 500° C. and 600° C.; the cesium heating temperature is between 275° C. and 300° C.; the platinum heating temperature is less than or equal to 300° C., and the bound calcining temperature is less than or equal to 300° C.

9. The process of claim 1, wherein the solid binder is selected from silica, alumina, magnesia, calcium oxide, and any combination thereof.

10. The process of claim 1, wherein the first colloidal binder has a particle size between 10 nm and 25 nm.

11. The process of claim 1, wherein the first colloidal binder has a surface area less than or equal to 250 m²/g.

12. The process of claim 1, wherein the first colloidal binder has a surface area between 250 m²/g and 100 m²/g.

13. The process of claim 1, wherein the naphtha aromatization catalyst comprises 0.1 wt. % to 10 wt. % germanium; 0.05 wt. % to 3 wt. % platinum; and 2 wt. % to 8 wt. % cesium; based on a total weight of the naphtha aromatization catalyst.

14. A process for preparing a naphtha aromatization catalyst comprising:
  preparing a detemplated germanium zeolite material from a germanium zeolite material containing a templating agent by one of a) or b)
    a) detemplating the germanium zeolite material containing the templating agent under a detemplating time/temperature protocol sufficient to remove all or substantially all of the templating agent in the germanium zeolite material to form the detemplated germanium zeolite material, where the detemplating time/temperature protocol includes a detemplating time period between 1 hour and 12 hours at a detemplating temperature between 400° C. and 600° C.; or
    b) adding between 20 wt. % to 60 wt. % of a binder composition to the germanium zeolite material containing the templating agent to form a bound germanium zeolite material, shaping the bound templated germanium zeolite material, and calcining the bound germanium zeolite for a time period between 1 hour and 12 hours at a calcining temperature between 400° C. and 600° C. to form the detemplated germanium zeolite material; and thereafter, performing steps (i) and (ii) in any order
    (i) ion-exchanging the detemplated germanium zeolite material with an exchange metal containing solution, where said step of ion-exchanging is performed at an ion-exchanging temperature between room temperature and 100° C.;
    (ii) impregnating the detemplated germanium zeolite material with a noble metal; and forming the naphtha aromatization catalyst by heating according to I) or II)
    I) heating the detemplated germanium zeolite material immediately after step (i) according to an exchanged heating time/temperature protocol, where the exchanged heating time/temperature protocol includes an exchange heating time between 1 hour and 12 hours at an exchange temperature from 250° C. to 300° C., and heating the detemplated germanium zeolite material immediately after step (ii) according to an impregnated heating time/temperature protocol, where the impregnated heating time/temperature protocol includes an impregnated heating time between 1 hour and 12 hours at an impregnated temperature ranging from 250° C. to less than 500° C. to form the naphtha aromatization catalyst; or II) after performing both steps (i) and (ii), heating the detemplated germanium zeolite material according to a combined heating time/temperature protocol to form the naphtha aromatization catalyst, where the combined heating time/temperature protocol includes a combined heating time between 1 hour and 12 hours at a combined temperature ranging from 250° C. to less than 500° C.;

with the proviso that if the process is performed using step (a), the following additional steps (1) and (2) must be performed after step (a)

(1) adding between 20 wt. % to 60 wt. % of the binder composition to form detemplated germanium zeolite material and shaping the detemplated germanium zeolite materials; and (2) calcining the detemplated germanium zeolite material from step (1) according to a bound calcining time/temperature protocol including a bound calcining time period between 1 hour and 12 hours at a bound calcining temperature less than or equal to 500° C.;

wherein the exchange metal is an alkali metal selected from of Na, K, Rb, Cs and any combination thereof; and alkaline earth metal selected from Mg, Ca, Sr, Ba, and any combination thereof, and, further wherein the noble metal is selected from Pt, Pd, Ir, Rh, Ru, and any combination thereof;

wherein the germanium zeolite material comprises a zeolite having a structure selected from MTW, FER, MEL, TON, MRE, MWW, ZSM-5, BEA, MOR, LTL, and MTT; and wherein the binder composition comprises
   a solid binder and a colloidal binder having particles between 10 nm and 30 nm, or
   the solid binder and a mixture of colloidal binders including at least 10 wt. % of a first colloidal binder having particles between 10 nm and 30 nm and the remainder being a second colloidal binder having particles less than 10 nm.

15. The process of claim 14, wherein the impregnating is a wet-incipient impregnating step.

16. The process of claim 14, wherein the solid binder is selected from silica, alumina, magnesia, calcium oxide, and any combination thereof.

17. The process of claim 14, wherein the germanium zeolite material is a medium pore zeolite having an average pore size in the range from 5A to 7A, has a $Si/Al_2$ atomic ratio of 40-500 and has a germanium content in the range from 0.1 wt. % to 10 wt. %.

* * * * *